United States Patent
Bharathy et al.

(10) Patent No.: US 12,072,936 B2
(45) Date of Patent: Aug. 27, 2024

(54) USING GRAPH QUERIES TO OBTAIN RESULTS FROM MACHINE LEARNING MODELS

(71) Applicant: Amazon Technologies, Inc., Seattle, WA (US)

(72) Inventors: Karthik Gurumoorthy Subramanya Bharathy, Sammamish, WA (US); Ankit Gupta, Rahuwas (IN); George Karypis, Bloomington, MN (US); Divyakala Vel, Redmond, WA (US); Bradley Bebee, Seattle, WA (US); Adesoji Adeshina, Vancouver (CA); Xiang Song, Shanghai (CN)

(73) Assignee: AMAZON TECHNOLOGIES, INC., Seattle, WA (US)

(*) Notice: Subject to any disclaimer, the term of this patent is extended or adjusted under 35 U.S.C. 154(b) by 215 days.

(21) Appl. No.: 17/313,769

(22) Filed: May 6, 2021

(65) Prior Publication Data
US 2022/0179910 A1 Jun. 9, 2022

Related U.S. Application Data

(63) Continuation of application No. PCT/CN2020/134603, filed on Dec. 8, 2020.

(51) Int. Cl.
*G06F 16/901* (2019.01)
*G06F 11/34* (2006.01)
(Continued)

(52) U.S. Cl.
CPC ...... *G06F 16/9024* (2019.01); *G06F 11/3419* (2013.01); *G06F 16/90324* (2019.01);
(Continued)

(58) Field of Classification Search
CPC ............ G06F 16/9024; G06F 16/9038; G06F 11/3419; G06F 18/29; G06F 16/90324;
(Continued)

(56) References Cited

U.S. PATENT DOCUMENTS 6,505,275 B1   1/2003  Weissman et al.
10,157,226 B1 * 12/2018  Costabello .......... G06F 16/3325
(Continued)

FOREIGN PATENT DOCUMENTS

CN   109636139 A   4/2019
CN   110377715 A   10/2019
(Continued)

OTHER PUBLICATIONS

International Search Report and Written Opinion mailed Sep. 9, 2021, International Patent Application No. PCT/CN2020/134603, filed Dec. 8, 2020.
(Continued)

*Primary Examiner* — Evan Aspinwall
(74) *Attorney, Agent, or Firm* — Davis Wright Tremaine LLP

(57) ABSTRACT

A computer-implemented method performed at least in part by a graph database configured to store at least one graph dataset. The method includes receiving a graph query configured to be performed against a machine learning model, and communicating the graph query with a machine learning system that is configured to use the machine learning model to obtain model inference results and communicate those model inference results to the graph database application. The graph database provides query results based at least in part on the model inference results to an entity.

20 Claims, 10 Drawing Sheets

(51) Int. Cl.
  *G06F 16/9032* (2019.01)
  *G06F 16/9038* (2019.01)
  *G06N 3/08* (2023.01)
  *G06N 20/00* (2019.01)
(52) U.S. Cl.
  CPC .......... *G06F 16/9038* (2019.01); *G06N 3/08* (2013.01); *G06N 20/00* (2019.01)
(58) Field of Classification Search
  CPC .. G06F 16/322; G06F 16/3329; G06F 16/367; G06F 16/84; G06F 16/90335; G06N 20/00; G06N 3/08; G06N 7/01; G06N 5/022; G06N 5/04; G06N 5/025; G06N 3/045
  USPC ......................................................... 707/798
  See application file for complete search history.

(56) References Cited

U.S. PATENT DOCUMENTS

| | | | | |
|---|---|---|---|---|
| 2012/0078891 | A1* | 3/2012 | Brown | G06F 16/3329 707/723 |
| 2016/0358098 | A1* | 12/2016 | Duesterwald | G06N 20/00 |
| 2017/0329870 | A1* | 11/2017 | Lindsley | G06N 5/02 |
| 2018/0007055 | A1 | 1/2018 | Infante-Lopez et al. | |
| 2018/0052884 | A1* | 2/2018 | Kale | G06F 16/242 |
| 2018/0130019 | A1* | 5/2018 | Kolb | G06F 16/24578 |
| 2018/0210966 | A1* | 7/2018 | Bedi | G06F 16/9024 |
| 2019/0042988 | A1* | 2/2019 | Brown | G06F 9/547 |
| 2019/0317994 | A1* | 10/2019 | Singh | G06F 40/30 |
| 2020/0226156 | A1* | 7/2020 | Borra | G06F 16/212 |
| 2020/0242642 | A1* | 7/2020 | Thimsen | G06Q 30/0203 |
| 2020/0250562 | A1* | 8/2020 | Bly | G06F 16/24578 |
| 2021/0081836 | A1* | 3/2021 | Polleri | G06F 16/9035 |
| 2021/0295822 | A1* | 9/2021 | Tomkins | G06F 9/547 |
| 2021/0406779 | A1* | 12/2021 | Hu | G06N 3/045 |
| 2023/0316128 | A1* | 10/2023 | Hodos | G06N 20/00 706/12 |

FOREIGN PATENT DOCUMENTS

| | | |
|---|---|---|
| CN | 111373366 A | 7/2020 |
| WO | 2018081633 A1 | 5/2018 |

OTHER PUBLICATIONS

European Patent Office Extended Search Report dated Jun. 21, 2024, Application No. 20964530.8, 8 pages.

USPTO Non-Final Office Action date May 9, 2024, U.S. Appl. No. 17/548,348, 6 pages.

* cited by examiner

USING GRAPH QUERIES TO OBTAIN RESULTS FROM MACHINE LEARNING MODELS

BACKGROUND

A graph database stores data in a graph data structure, referred to as a graph dataset, and executes queries against that graph dataset. A standard graph query language may be used to instruct the graph database with respect to which information a user would like to select and return in query results. For example, developers build applications that rely on graph queries to gain insights into graph datasets. Unfortunately, the performance of a graph database suffers as more information is stored by the graph database. Further, some queries may simply require too much time to be performed in real-time, which is a serious drawback for application developers.

BRIEF DESCRIPTION OF THE DRAWINGS

Various techniques will be described with reference to the drawings, in which.

DETAILED DESCRIPTION

Figure 1:
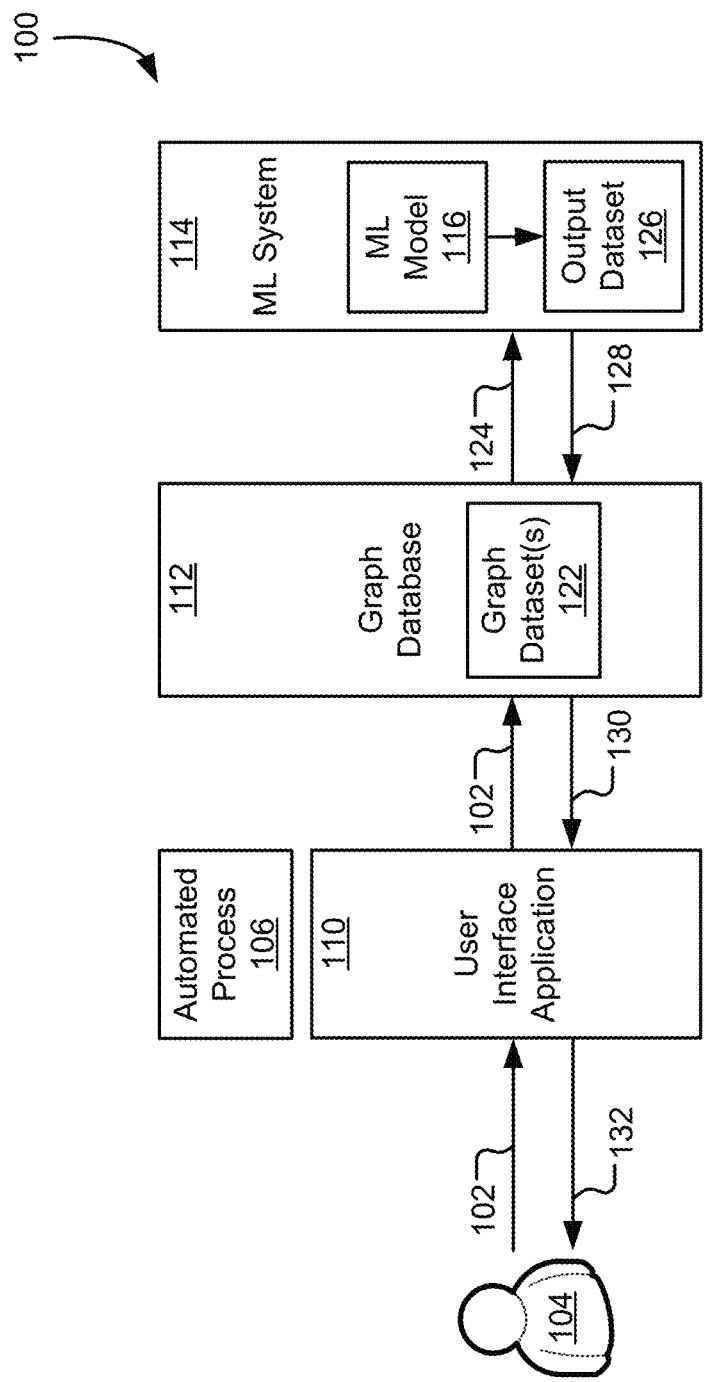
FIG. 1 is a block diagram of a system configured to implement machine learning inference based at least in part on a graph query provided to a graph database.

One or more automated machine learning "ML" techniques may be used to improve results that would be obtainable by querying a graph dataset stored by a graph database alone. For example, ML techniques may be used to speed processing and improve accuracy of graph queries.

The graph database (e.g., a graph database hosted by a service of a computing resource service provider) may be configured to receive a graph query written in a standard graph query language (e.g., Apache TinkerPop Gremlin, SPARQL, and the like) that has been extended to identify one or more ML models against which the graph query is to be executed. For example, the ML model(s) may include a graph neural network ("GNN") that is configured to read an input graph dataset that may be a portion of a graph dataset exported from the graph database. For ease of illustration, the graph query will be described as identifying a selected ML model. The graph database is configured to instruct a ML system (e.g., a ML service hosted by the computing resource service provider) to execute the selected ML model identified in the graph query and generate an output graph dataset. Then, the graph database or the ML system executes the graph query against the output graph dataset and obtains the desired query results. Thus, the graph database allows developers to easily access ML models using conventional graph database tools and standard graph query languages that have been extended to identify the ML model(s) that generate the output graph dataset(s) against which graph queries may be executed. Further, this capability may improve the speed and/or accuracy of graph queries because ML models, such as GNNs, may be purpose build for graph datasets and configured for use with highly related and/or large datasets.

One or more users may create and train the selected ML model before the graph query is executed. Alternatively, the selected ML model may be created and trained entirely by one or more automated processes. One method of creating and training the selected ML model includes a user instructing the graph database to export at least a portion of the graph dataset into an object (e.g., a file or bucket of a storage service operated as a service by the computing resource service provider) having a format that is readable by the ML system. The graph database may be configured to receive user supplied configuration information about the selected ML model and supply the configuration information to the ML system, for example, by storing the configuration information in a configuration file. The configuration information may specify which information (e.g., nodes and/or edges) is to be included in the output graph dataset and therefore, is to be modeled by the selected ML model. The configuration information may also include any relevant infrastructure property values, such as which instance type to use, how many rounds to use, CPU to target, GPU to target, and the like. In other words, the configuration information may identify which hyper-parameters to use and may include a value or range of values for each of the hyper-parameters. Hyper-parameters define features and/or structure of the selected ML model.

After the portion of the graph dataset is exported, the ML system may optionally process the exported portion. During this processing, the ML system reads the exported portion and the configuration information (e.g., stored in the configuration file), and may reformat the exported portion for use by the ML system, convert some node properties into node features, infer some information (e.g., if the exported portion has an incomplete graph structure, such as one or more missing node feature values), and recognize target values (such as target nodes, target edges, target labels, and the like). For example, the configuration information may specify what the selected ML model is to predict or infer. By way of a non-limiting example, the configuration information may identify a particular node property of one or more target nodes that the selected ML model needs to infer from the input dataset. For example, the configuration information may specify that the selected ML model is to perform node classification during which one or more properties of a set of nodes are predicted and included in the output graph dataset. After the ML system has processed the exported portion, the ML system outputs the processed data as an input graph dataset. Alternatively, the processing step may be omitted and the exported portion used as the input graph dataset.

Then, the graph database instructs the ML system to perform one or more training related tasks, such as hyper-parameter optimization, referred to as "tuning." Typically, values of hyper-parameters are learned when the selected ML model is trained, for example, by optimizing a loss function. The ML system may tune the hyper-parameters automatically. For example, the ML system may conduct automated experiments using different hyper-parameter values, compare the results of these experiments, and select the hyper-parameter values that yielded the best results. The ML system may define default values for the hyper-parameters, default ranges of hyper-parameter values, and the like. Each unique set of hyper-parameter values generates a different ML model. After a set of different models has been created, the graph database and/or the ML system may automatically select the best ML model according to selection criteria (e.g., the loss function). The graph database may instruct the ML system to deploy or generate an inference endpoint service that may be accessible by an application programing interface ("API"), such as a REST API or command line API. The graph database is configured to use the API to invoke the inference endpoint service, instruct the ML system to execute the selected ML model to create the output graph dataset, query or access inferences included in the output graph dataset, and receive the query results.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 is a block diagram of a system 100 configured to implement ML inference based at least in part on a graph query 102 provided to a graph database. The graph query 102 may be any query configured to be performed against the graph database. ML inference is a process of providing input data to a previously created and, if applicable, trained ML model, which the ML model uses to output model results, such as a numerical score, an output graph dataset, and the like. ML inference may also be referred to as "operationalizing the ML model" or "putting the ML model into production." Referring to FIG. 1, the graph query 102 may be provided by a user 104 or an automated process 106.

The system 100 includes a user interface service or application 110, a graph database 112, and a ML system 114. The ML system 114 includes or has access to at least one ML model 116. By way of a non-limiting example, the user interface application 110, the graph database 112, and the ML system 114 may each be executing inside a virtual private cloud but, this is not a requirement. When present, the automated process 106 may be executing inside or outside the virtual private cloud (e.g., a private physical or virtual network of a customer, part or all of which may be hosted by a computing resource service provider).

The user interface application 110 is an application or service implemented by one or more interface servers or computing systems (e.g., operating at least in part within the virtual private cloud). In the embodiment illustrated, the user interface application 110 is configured to be operated by the user 104, receive the graph query 102 as input from the user 104, and communicate the graph query 102 to the graph database 112. However, as mentioned above, the graph query 102 may be provided by the automated process 106. In such embodiments, the user interface application 110 may receive the graph query 102 from the automated process 106 and communicate the graph query 102 to the graph database 112. Alternatively, the automated process 106 may communicate the graph query 102 directly to the graph database 112 and the user interface application 110 may be omitted. By way of a non-limiting example, the user interface application 110 may be an interface to the virtual private cloud but, this is not a requirement.

The graph database 112 is an application or service implemented by one or more database servers or computing systems (e.g., operating at least in part within the virtual private cloud). The graph database 112 is configured to store data in a graph data structure, referred to as a graph dataset, and execute queries against the graph dataset. In particular, highly connected datasets may benefit from being stored in a graph dataset. Within the graph dataset, the data is organized into nodes and edges. Each edge connects a pair of related nodes to one another and provides information about that relationship. For example, the nodes in the graph dataset may each represent a different technical paper and each of the edges may indicate that a first technical paper represented by a first node cites a second technical paper represented by a second node. Each of the nodes may have one or more properties or parameter values associated therewith. For example, each of the nodes representing a different technical paper may be associated with parameter values storing data related to the technical papers. By way of non-limiting examples, such nodes may each be associated with parameter values representing author(s), topic(s), publication date, journal name, title, and the like. Further, the edges may include multiple sets of edges with each set representing a different type of relationship. For example, as mentioned above, a first set of the edges may represent citations amongst the papers represented by the nodes and a second set of the edges may represent a subsequent paper commenting on an earlier paper.

The graph dataset may be queried using a standard query language, such as SPARQL for a Resource Description Framework ("RDF") graph model, Apache TinkerPop Gremlin for a Property Graph model, or a similar graph model and/or query language. In the embodiment illustrated, the graph database 112 is configured to receive graph queries and execute them against one or more graph datasets 122 stored by the graph database 112. The graph database 112 may be configured to understand custom commands and/or parameters added to the graph query 102 that are not part of a standard graph query language (e.g., Apache TinkerPop Gremlin, SPARQL, and the like). The custom commands and/or parameters may identify one or more ML models (e.g., the ML model 116) against which the graph query 102 is to be executed. In other words, the standard graph query language may be extended to include these additional commands and/or parameters. Alternatively, a non-standard graph query language may be used that includes these or similar commands and/or parameters. Thus, when the graph database 112 receives a graph query, the graph database 112 is configured to identify whether the graph database 112 needs to perform the graph query against the graph dataset(s) 122 or forward the graph query to the ML system 114 for processing. For example, when the graph database 112 receives the graph query 102, the graph database 112 reads the custom commands and/or parameters included the graph query 102, determines that the graph query 102 needs to be performed by the ML system 114, formulates an invoke endpoint request 124 that includes the graph query 102, and forwards the invoke endpoint request 124 to the ML system 114.

The ML system 114 is an application or service implemented by one or more ML servers or computing systems (e.g., operating at least in part within the virtual private cloud). The ML system 114 is configured to receive the invoke endpoint request 124, execute the ML model 116 using information included in the invoke endpoint request 124, produce an output graph dataset 126, perform the graph query 102 against the output graph dataset 126 to obtain a query result, and forward an invoke endpoint response 128 with the query result to the graph database 112. By way of non-limiting examples, the ML system 114 may be used to perform one or more of the following tasks:

Classify one or more nodes (e.g., predict whether a particular node is fraud or not);
Classify one or more edges (e.g., predict one or more labels for a particular edge);
Predict an edge;
Find one or more target nodes (e.g., predict a target node for a particular source node and set of edge labels);
Find one or more source nodes; and
Find one or more edge labels (e.g., predict an edge label for an edge connecting a source node and a target node).

Further, the ML system 114 may be configured to build, train, and deploy the ML model 116.

The graph database 112 receives the invoke endpoint response 128 with the query result, formulates a query response 130, and forwards the query response 130 to the entity that sent the graph query 102 to the graph database 112. Thus, in the embodiment illustrated, the graph database 112 forwards the query response 130 to the user interface application 110. In alternate embodiments, the graph database 112 may forward the query response 130 to the automated process 106 when the automated process 106 sent the graph query 102 to the graph database 112.

Thus, when the graph database 112 determines it needs to fetch the query result from the ML model 116, the graph database 112 will send the invoke endpoint request 124 to the ML system 114. Then, after the graph database 112 receives the invoke endpoint response 128, the graph database 112 uses the invoke endpoint response 128 to produce final query results 132 included in the query response 130, which the graph database 112 transmits to the user interface application 110.

Next, in the embodiment illustrated, the user interface application 110 provides the final query results 132 to the user 104. For example, the user interface application 110 may generate a graphical user interface ("GUI") displaying the final query results 132 to the user 104. By way of another non-limiting example, the user interface application 110 may make the final query results 132 available for download by the user 104.

Figure 2:
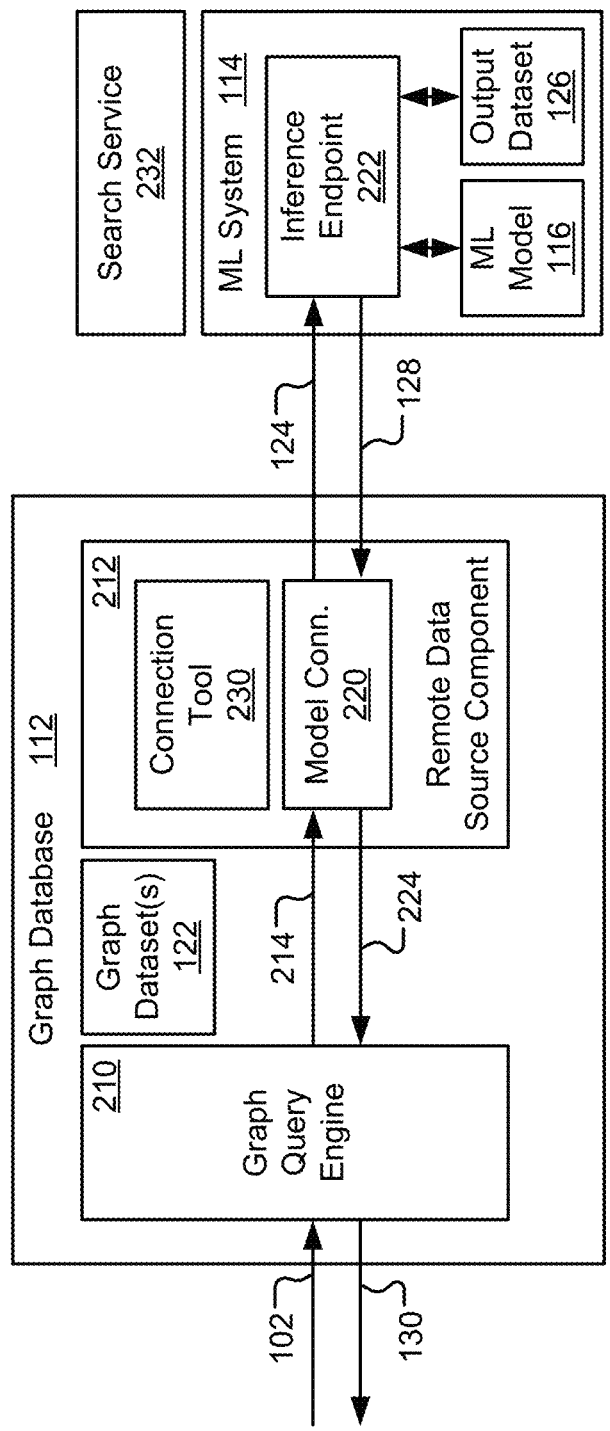
FIG. 2 is a block diagram illustrating some of the components of the graph database and a machine learning system of the system of FIG. 1 involved in implementing graph queries configured to be executed at least in part by a machine learning model.

FIG. 2 is a block diagram illustrating some of the components of the graph database 112 and the ML system 114. Referring to FIG. 2, the graph database 112 includes a graph query engine 210 and an external or remote data source component 212. The graph query engine 210 is configured to receive graph queries and execute them against the graph dataset(s) 122, which are stored by the graph database 112.

The graph query engine 210 may be configured to understand the custom commands and/or parameters added to the graph query 102 that are not part of a standard graph query language (e.g., Apache TinkerPop Gremlin, SPARQL, and the like) and/or are part of a non-standard graph query language and use the custom commands and/or parameters to identify the ML model(s) (e.g., the ML model 116) against which the graph query 102 is to be executed. For example, when the graph database 112 receives the graph query 102, the graph query engine 210 generates a remote call communication 214 based at least in part on the graph query 202, and forwards the remote call communication 214 to the remote data source component 212. The remote call communication 214 includes the graph query 102, which identifies the ML model 116.

The remote data source component 212 includes a model connector component 220 configured to formulate the invoke endpoint request 124 and forward the invoke endpoint request 124 to the ML system 114. In the embodiment illustrated, the model connector component 220 sends the invoke endpoint request 124 to an inference endpoint 222 implemented by the ML system 114. The inference endpoint 222 may be accessible by an application programing interface ("API"), such as a REST API or command line API. The inference endpoint 222 may be implemented as a service operating within the virtual private cloud. The model connector component 220 formulates the invoke endpoint request 124 to use the API to invoke the inference endpoint 222, instruct the ML system 114 to execute the selected ML model 116 to create the output graph dataset 126, query or access inferences included in the output graph dataset 126 to obtain the query result, formulate the invoke endpoint response 128, and send the invoke endpoint response 128 to the model connector component 220.

The model connector component 220 receives the invoke endpoint response 128 and generates a remote call response 224, including the query result, based at least in part on the invoke endpoint response 128, and transmits the remote call response 224 to the graph query engine 210. The graph query engine 210 receives the remote call response 224, produces the final query results 132, formulates the query response 130 including the final query results 132, and, as described above, provides the query response 130 to the entity that sent the graph query 102 to the graph database 112 (e.g., the user interface application 110 or the automated process 106 illustrated in FIG. 1).

The graph query engine 210 may also be configured to recognize other types of queries and/or requests to perform other types of analysis. When such a query or request is received, the graph query engine 210 may forward the query or request to a connection tool 230 for processing. In the embodiment illustrated, the connection tool 230 is a component of the remote data source component 212, but this is not a requirement. In some embodiments, the connection tool 230 may be external to the graph database 112. The connection tool 230 may be configured to send a request to an external search service 232 configured to perform the query or requested analysis and return the results to the connection tool 230, which, in turn, returns the results to the graph query engine 210. The graph query engine 210 may be configured to combine the results obtained from the external search service 232 with query results obtained from the ML model 116 and/or results obtained from querying the graph dataset(s) 122. This provides customers (e.g., the user 104 illustrated in FIGS. 1 and 3-6) with the flexibility to create complex graph queries that combine one or more queries against the graph dataset(s) 122 and/or the external search service 232 with one or more queries against the output graph dataset 126 generated by the ML model 116.

By way of a non-limiting example, the model connector component 220 may convert the query result into a first object, such as a BindingSet, that the model connector component 220 includes in the remote call response 224. In such embodiments, the graph query engine 210 may translate the first object into one or more second objects, such as one or more specific BindingSets, and may join the second object(s) with other query results (e.g., obtained by querying the graph dataset(s) 122 and/or using the connection tool 230).

Figure 3:
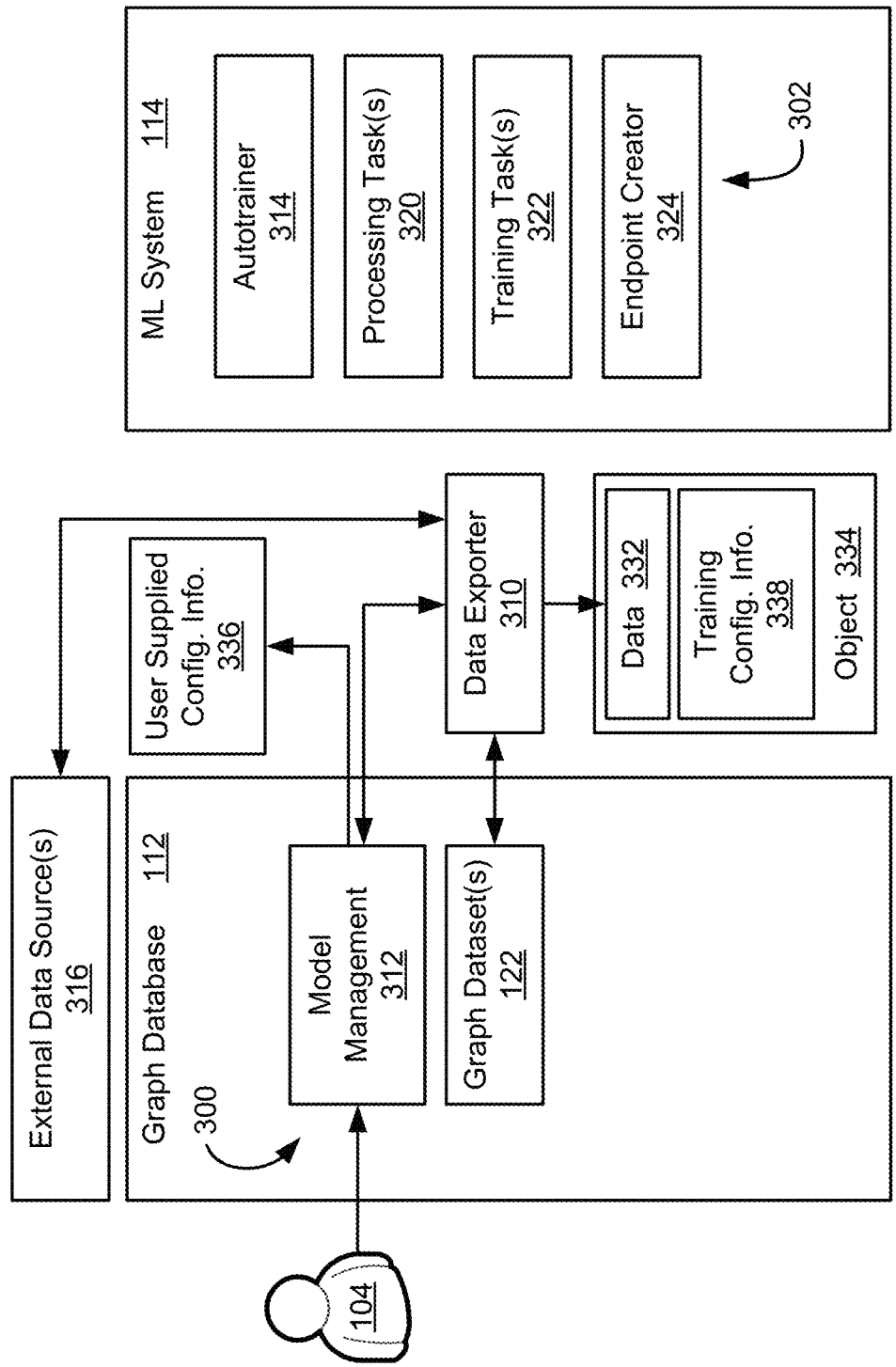
FIG. 3 is a block diagram illustrating some of the components of the graph database and the machine learning system of the system of FIG. 1 involved in exporting data from the graph database.

FIG. 3 is a block diagram illustrating some of the components of the graph database 112 and the ML system 114. Referring to FIG. 3, the graph database 112 includes or has access to one or more software components 300 that may each be implemented as one or more APIs. The software component(s) 300 are configured to enable users (e.g., the user 104) to manage the lifecycle of the ML model 116 for various prediction tasks on graph data. The software component(s) 300 may implement create, describe, stop/delete operations for data export jobs, data processing jobs, model training jobs, and model endpoint related jobs. In the embodiment illustrated, the software component(s) 300 include(s) a model management component 312. The software component(s) 300 may include a data exporter 310 or the data exporter 310 may be implemented as a component that is separate from the graph database 112. For example, in the embodiment illustrated, the data exporter 310 is implemented as a separate component that has access to at least one external data source 316 that is separate (e.g., remote) from the graph database 112. The external data source(s) 316 may be implemented as any data storage system or device configured to store data, such as memory, a file, a relational database, a graph database, a data lake, and the like. The software component(s) 300 may include an auto-trainer 314 or the auto-trainer 314 may be implemented as a component that is separate from the graph database 112. For example, in the embodiment illustrated, the auto-trainer 314 has been implemented as a component of the ML system 114.

One or more of the software component(s) 300 (e.g., one or more APIs) may each have a frontend component that is directly exposed to the user 104 (e.g., one or more customers). For example, each frontend component may create a ML resource in the ML system 114 and associate that ML resource with a user defined task identifier that the graph database 112 may use to obtain status information with respect to the tasks. Each frontend component may set sensible defaults for the ML modeling task(s) managed by the software component to provide a streamlined user experience for the user 104. Because the software component(s) 300 are available from within the graph database 112, the user 104 may perform both graph analytics and ML related tasks all in one place.

The software component(s) 300 may each have one or more backend components 302 that each may be implemented as an executable code package configured to run as a managed job within the ML system 114. For example, each of the backend component(s) 302 may run as an instance within a customer account in the ML system 114. The backend component(s) 302 use the ML system 114 (e.g., a Deep Graph Library ("DGL")) to model graph data exported from the graph database 112, define ML model architectures for various ML tasks, and implement model training using the exported graph data. In the embodiment illustrated, the backend component(s) 302 include(s) a processing task(s) component 320, a training task(s) component 322, and an endpoint creator component 324. By way of a non-limiting example, the backend component(s) 302 may use DGL to implement GNNs in the ML system 114. Implementing each of the backend component(s) 302 to run directly as a managed job within the ML system 114 means that the user 104 may take advantage of features available in the ML system 114. Each of the software component(s) 300 may be configured to provide a coherent user experience by combining the frontend component that manages ML resources for various aspects of the ML pipeline, and the backend component(s) 302 that provide(s) access to ML models and modeling techniques for ML on graphs.

FIG. 3 also illustrates a data flow as the graph database 112 obtains data 332 that is used by the graph database 112 and/or the ML system 114 to create the ML model 116 (see FIGS. 1, 2, 5, and 6). For example, the data exporter 310 may help create the ML model 116 by exporting data from the graph dataset(s) 122 that is used to create an input graph dataset 400 (see FIG. 4). In other words, the data exporter 310 may be configured to perform a data export job, which exports the data 332 from the graph dataset(s) 122 and stores the data 332 in an object 334 (e.g., a file or bucket of a storage service operated as a service by the computing resource service provider) having a format that is readable by the ML system 114. The data exporter 310 may be used, for example, to export a new portion of the graph dataset(s) 122 after date stored thereby has been updated.

Alternatively, the data exporter 310 may obtain the data 332 from the external data source(s) 316. In such embodiments, the data exporter 310 may be configured to perform a data extraction job, which extracts (e.g., using a query) the data 332 from the external data source(s) 316 and stores the data 332 in the object 334 having the format readable by the ML system 114. Optionally, the data exporter 310 may be configured to obtain the data 332 by combining data the data exporter 310 exported from the graph dataset(s) 122 with data the data exporter 310 extracted from the external data source(s) 316.

The data exporter 310 may be instructed by the user 104 and/or the model management component 312 to obtain the data 332 and store the data 332 in the object 334. The data exporter 310 may be configured to receive configuration information supplied by the user 104 (e.g., via the model management component 312) for use when creating, training, and deploying the selected ML model 116 (see FIGS. 1, 2, 5, and 6). The data exporter 310 may store this user supplied configuration information as configuration information 336 (e.g., in a configuration file) that is readable by the ML system 114. Optionally, the configuration information 336 may be stored in the object 334. The data exporter 310 may be configured to store training configuration information 338 for use by the ML system 114 when training the ML model 116. In the embodiment illustrated, the training configuration information 338 is stored in the object 334 but, this is not a requirement.

Figure 4:
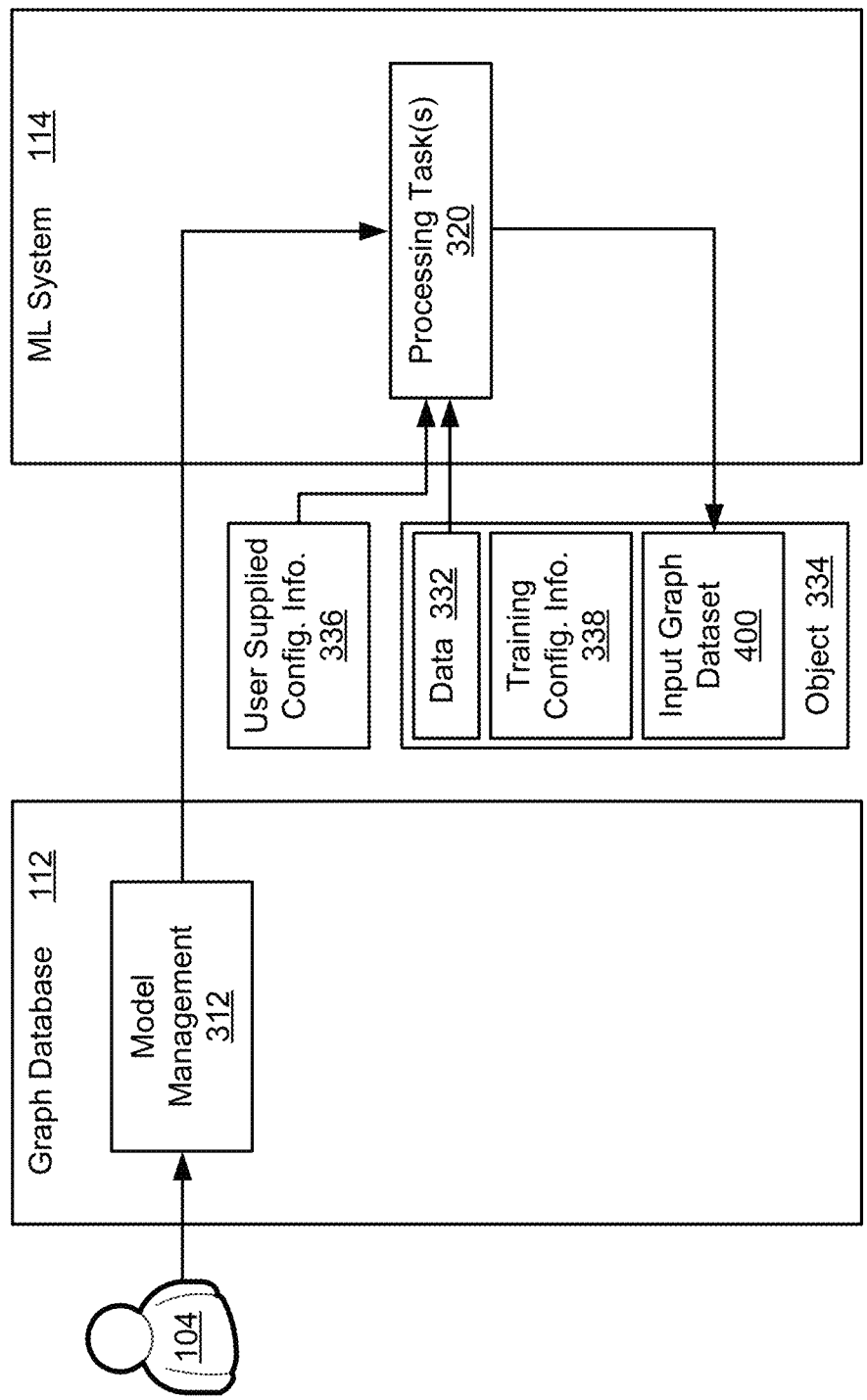
FIG. 4 illustrates a data flow through the graph database and the machine learning system as the machine learning system obtains an input graph dataset by processing the data exported from the graph database.

FIG. 4 illustrates a data flow through the graph database 112 and the ML system 114 as the processing task(s) component 320 processes the data 332 and the configuration information 336. The processing task(s) component 320 may be a backend component of the model management component 312. The processing task(s) component 320 is configured to read the data 332 stored in the object 334 and the configuration information 336, process the data 332 for use by the ML system 114, and output the processed portion as the input graph dataset 400. For example, the processing task(s) component 320 may reconfigure the data 332 for use by the DGL, which is configured to implement a particular machine learning task (e.g., one or more GNNs) in the ML system 114. In the embodiment illustrated, the processing task(s) component 320 stores the input graph dataset 400 in the object 334 but, this is not a requirement.

In the embodiment illustrated, the data 332 may be processed by the processing task(s) component 320 before the ML model 116 is created and trained for several reasons. For example, converting or transforming large graph datasets (e.g., that include millions of nodes and billions of edges) included in the data 332 to the input graph dataset 400 (e.g., having DGLGraph format) may take a significant amount of time (e.g., hours). Fortunately, the data 332 may be converted or transformed into the input graph dataset 400 once and used repeatedly if the corresponding data in the graph database 112 does not change. Further, the exported data 332 may include dirty information, such as incomplete graph structure, missing feature files, and the like, that may crash the ML system 114 or a process executing therein when the input graph dataset 400 is loading. Therefore, debugging the data 332 in a standalone or separate environment may be desirable. Additionally, processing the data 332 may consume a significant amount of memory when the data 332 is large. Thus, the user 104 may choose to perform the processing on a large memory CPU machine. However, in alternate embodiments, the processing may be performed as part of the training process.

Figure 5:
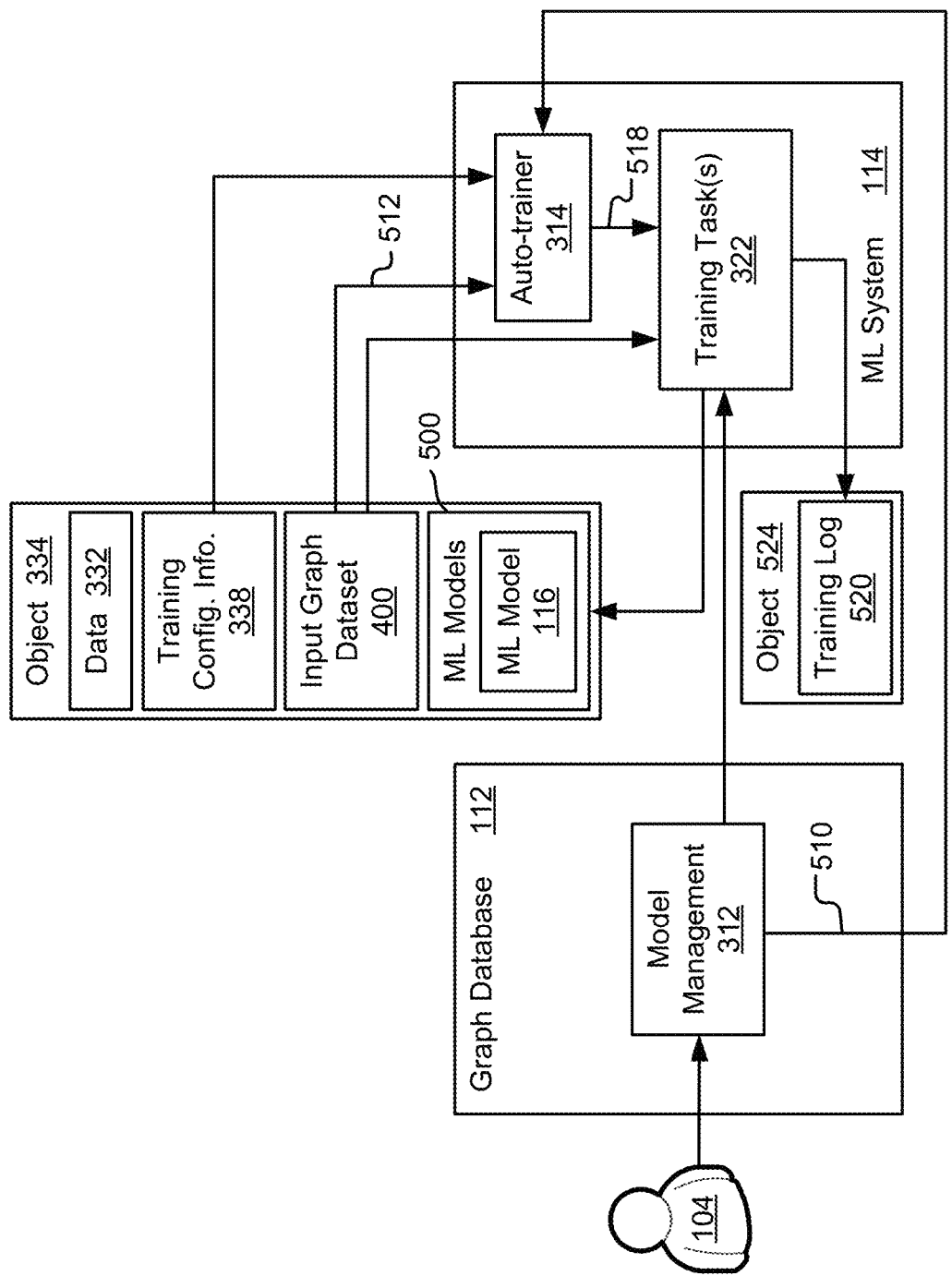
FIG. 5 illustrates a data flow through the graph database and the machine learning system as the machine learning system creates and trains a set of machine learning models using the input graph dataset.

FIG. 5 illustrates a data flow through the graph database 112 and the ML system 114 as the training task(s) component 322 creates and trains a set of ML models 500 using the input graph dataset 400. The training task(s) component 322 may be a backend component of the model management component 312. The training task(s) component 322 is configured to perform any model training jobs or tasks necessary to create and train the ML model 116. When the training task(s) component 322 is configured to create GNNs, the model training tasks define graph specific or graph-based ML model architectures that are trained on the input graph dataset 400 using a variety of hyper-parameter configurations. Each unique set of hyper-parameter values generates a different ML model. Thus, the set of ML models 500 may include a different ML model for each the unique set of hyper-parameter values. The set of ML models 500 may be stored in the object 334.

The model management component 312 may be configured to send a training instruction 510 to the auto-trainer 314. The auto-trainer 314 is configured to interact with the graph database 112 and the object 334. In the embodiment illustrated, the auto-trainer 314 is a component of the ML system 114 and may be configured to interact with other components (e.g., the training task(s) component 322) of the ML system 114. The auto-trainer 314 may parse the training instruction 510, gather dataset information 512 (e.g., a data specification) from the object 334, gather the training configuration information 338, generate a hyper-parameter tuning plan based at least in part on the training configuration information 338, and transmit a communication 518 to the training task(s) component 322 executing inside the ML system 114. The communication 518 includes the hyper-parameter tuning plan and/or instructions to execute one or more hyper-parameter tuning tasks according to the hyper-parameter tuning plan.

The system 100 (see FIG. 1) may be used for a variety of use-cases and graph datasets. Therefore, hyper-parameter configurations and/or values are used determine the specifics of the desired ML model 116. The hyper-parameters may be characterized as being tunable knobs that allow the graph database 112 and/or the ML system 114 to test different model configurations for a particular task, and select the ML model from the set of ML models 500 that works the best, instead of having a one-size-fits-all approach. By way of non-limiting examples, the hyper-parameters may include hyper-parameters that determine the model architecture, such as a number of layers, a number of hidden units, a dropout rate, etc. By way of further non-limiting examples, the hyper-parameters may include hyper-parameters that affect the model training or optimization procedure, such as a batch-size, a number of epochs, a learning rate, and the like. By way of yet another non-limiting example, the graph database 112 and/or the ML system 114 may use a heuristic to determine how many hyper-parameters to tune based on a number of runs. For example, if the user 104 specified that the training task(s) component 322 is to perform 10 runs, the heuristic may indicate 4-5 hyper-parameters may be tuned. On the other hand, if the user 104 specified that the training task(s) component 322 is to perform 100 runs, the heuristic may indicate 6-8 hyper-parameters may be tuned. The hyper-parameters used and their values may be determined based on the graph type of the input graph dataset 400 and/or modeling decisions related thereto. Such modeling decisions may include the prioritization of the hyper-parameters, which may be used to organize the hyper-parameters into tiers (described below).

The hyper-parameters may be organized into one or more tiers of hyper-parameters based on their ability to impact the ML model. For example, the number of hidden units, the number of training epochs, and the learning rate may be more impactful than the dropout rate. Thus, the number of hidden units, the number of training epochs may be categorized as Tier 1 hyper-parameters and the dropout rate may be categorized as a Tier 2 hyper-parameter. The Tier 1 hyper-parameters may be varied and any hyper-parameters on the other tiers may be set to default values if the user 104 wants to run only a handful of training jobs. On the other hand, if the user 104 wants to run more training jobs, hyper-parameters on the tiers in addition to Tier 1 may be varied. For example, both the Tier 1 and Tier 2 hyper-parameters may be varied and any hyper-parameters on the other tiers may be set to default values. Thus, the tiers may be used to help ensure that the ML system 114 creates an effective ML model in situations in which the user 10 has a fixed or low budget for training by helping to ensure that more impactful hyper-parameters are sufficiently varied.

The auto-trainer 314 may generate the tiers, which allow the hyper-parameter tuning process to be adapted to the training budget of the user 104. In addition, the auto-trainer 314 takes the burden off of the user 104 of providing very detailed specifications of all of the hyper-parameter values used during training. Referring to FIG. 1, this allows the system 100 (see FIG. 1) to run quick precomputations for setting sensible defaults and to provide ranges of hyper-parameter values that work well for the particular ML model that the ML system 114 is generating.

Referring to FIG. 5, any training tasks identified in the communication 518 and/or provided to the training task(s) component 322 by the model management component 312 are managed by the ML system 114. The training tasks may access the input graph dataset 400 stored in the object 334 and output training results, including the set of ML models 500, to the object 334. The graph database 112 may query or request status from the ML system 114 regarding the training tasks. The ML system may store a training log 520 in an object 524 (e.g., a file or bucket of a storage service operated as a service by the computing resource service provider).

The training log 520 is accessible by the auto-trainer 314 and/or the model management component 312 may be used to help improve the training process (e.g., iteratively).

By way of a non-limiting example, the ML model 116 may be implemented as a GNN having a GNN architecture configured to model a particular task. In such embodiments, the model management component 312 and/or the auto-trainer 314 directs the training task(s) component 322 to perform the training tasks that train the GNN architecture on the input graph dataset 400 to model that particular task. By way of a non-limiting example, such training tasks may include one or more of the following:

i. Node Classification, which involves predicting categorical properties of a node;
ii. Node Regression, which involves predicting numerical properties of a node;
iii. Edge Classification, which involves predicting categorical properties of an edge;
iv. Edge Regression, which involves predicting numerical properties of an edge; and
v. Link Prediction, which involves predicting the likelihood of an edge forming between any nodes within the graph.

For each of the training tasks, the ML system 114 may include a Relational Graph Convolution Network ("RGCN") Graph encoder configured to learn representations (or embeddings) of the input graph dataset 400 and a decoder configured to translate learned embeddings into predictions. By way of a non-limiting example, for link prediction on knowledge graphs, the ML system 114 may implement Knowledge Graph Embedding ("KGE") models. The KGE models may be trained end-to-end using label information provided in the input graph dataset 400 as a supervision signal for classification and regression training tasks, and using existing edges and randomly generated negative edges for link prediction training tasks. The KGE models may be implemented using DGL-KE or another similar software library or tool configured to implement KGE models.

The user 104 may create a model training job using the model management component 312, which launches a processing job using the training task(s) component 322. The processing job may generate or obtain (e.g., in the communication 518) a hyper-parameter strategy and/or an objective metric for model evaluation (e.g., a loss function). Then, the processing job launches a hyper-parameter tuning job that will run a fixed number of trials (e.g., specified by the user 104) and generates the set of ML models 500. Once the set of ML models 500 is generated, the model management component 312 selects one model in the set of ML models 500 based at least in part on the objective metric.

The ML system 114 may be configured to be used in a variety of computing environments, which provides flexibility for the user 104. For example, the ML system 114 may be configured to implement model training using a CPU only instance, a GPU enabled instance, or an instance with multiple GPUs without any additional effort from the user 104. By way of another non-limiting example, the user 104 may choose to enable training on spot instances to reduce cost. To support training on a variety of graphs of different sizes, the ML system 114 may be configured to implement mini-batch training, neighbor sampling, and the like. Such embodiments may provide a scalable implementation configured to train the ML model 116 even when the input graph dataset 400 is large. The hyper-parameters used to implement neighbor sampling may include a number of neighbors sampled for each node in a forward pass. Further, the model management component 312, the auto-trainer 314, and/or the training task(s) component 322 may tune this hyper-parameter.

During training or when training is completed, the ML system 114 computes training results, which may include final graph embeddings for a link prediction task, computed predictions for a node classification task or a node regression task, predicted labels, parameters of the model, and the like. To avoid repeated computations and in contrast to what is done during training, the ML system 114 may compute the representation at each layer for all of the nodes before moving on to the next layer. This contributes to saving the overall time within the model training job that is consumed by computing the training results. The ML system 114 and/or the graph database 112 may store the training results in the object 334 but, this is not a requirement.

Figure 6:
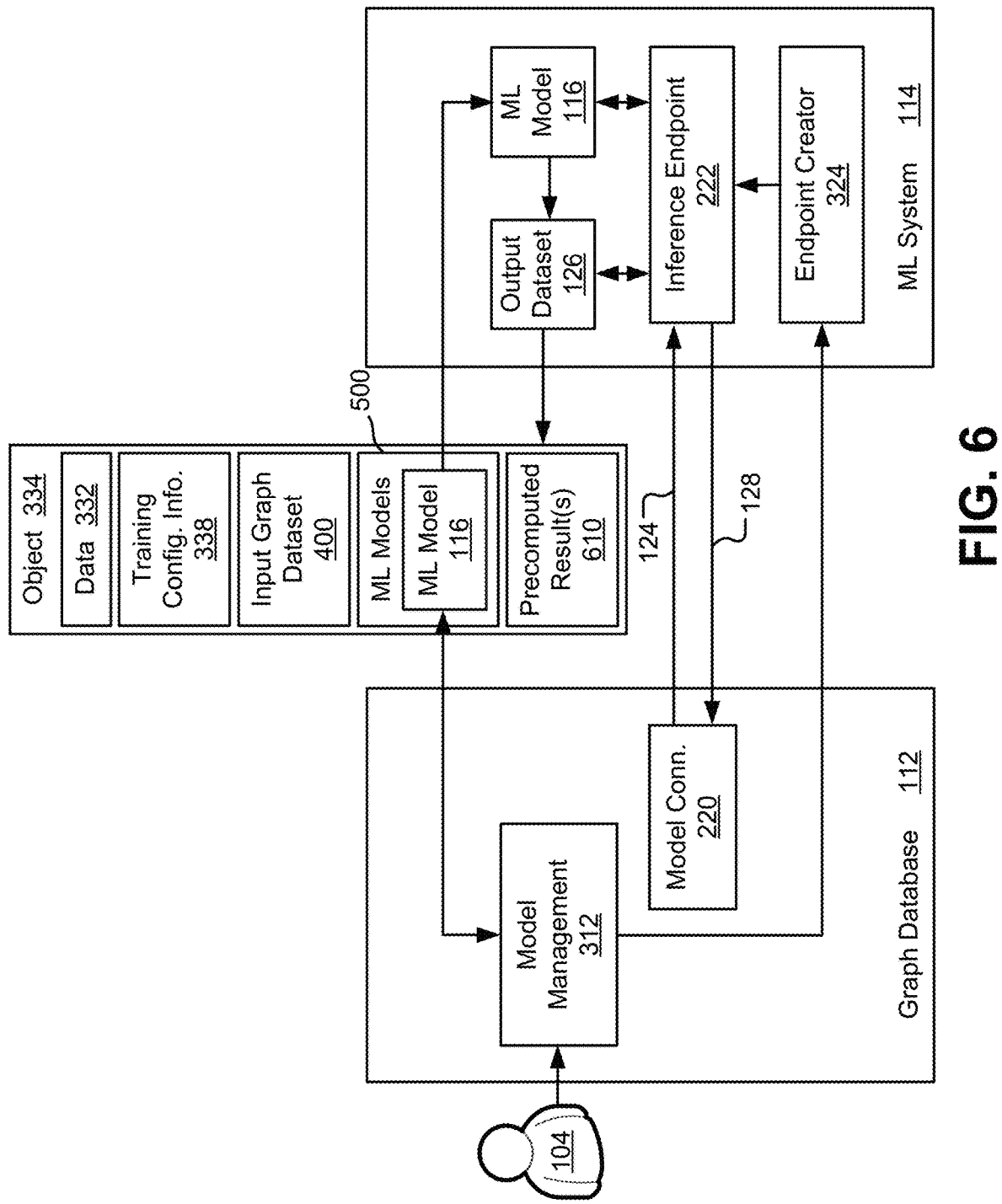
FIG. 6 illustrates a data flow through the graph database and the machine learning system as the machine learning system creates an inference endpoint.

FIG. 6 illustrates a data flow through the graph database 112 and the ML system 114 as the endpoint creator component 324 creates the inference endpoint 222. Referring to FIG. 6, the endpoint creator component 324 may be a backend component of the model management component 312. After the set of ML models 500 has been created, the model management component 312 may automatically select the best ML model according to the objective metric. In other words, the model management component 312 determines which of the training tasks or model in the set of ML models 500 exhibited the best performance and selects that ML model. In the example illustrated, the model management component 312 selects the ML model 116. Optionally, the model management component 312 may instruct the ML system 114 to execute the selected ML model 116 to generate a pre-computed result 610 and store the pre-computed result 610 in the object 334.

After the model management component 312 selects the ML model 116, the model management component 312 deploys the inference endpoint 222. To deploy the inference endpoint 222, the model management component 312 selects a suitable endpoint template with which to deploy the selected ML model 116 and instructs the endpoint creator component 324 to create the inference endpoint 222. Thus, the endpoint creator component 324 and the model management component 312 may be configured to perform one or more model endpoint related jobs. The inference endpoint 222 may download the selected ML model 116 or the pre-computed result 610 obtained from the ML model 116 from the object 334. Then, as described above, to query the ML model 116, the model connector component 220 may send the invoke endpoint request 124 to the inference endpoint 222 and receive the invoke endpoint response 128 from the inference endpoint 222. The inference endpoint 222 may be a managed instance configured to be directly invoked by the invoke endpoint request 124, which may include one or more data inputs that are used to obtain the query result (e.g., one or more predictions) from the trained ML model 116. As mentioned above, the ML system 114 returns the query result in the invoke endpoint response 128 via the inference endpoint 222.

As mentioned above, the graph query engine 210 (see FIG. 2) may be configured for use with an extended version of a standard graph query language (e.g., Apache TinkerPop Gremlin, SPARQL, and the like) query language or a non-standard graph query language that supports making predictions about graph properties. After training and deploying the ML model 116 to the inference endpoint 222, the user 104 may directly access the inference endpoint 222 via the model management component 312 to obtain predictions generated by the ML model 116 by writing queries (e.g., the graph query 102 illustrated in FIGS. 1 and 2) and submitting them to the graph database 112. Allowing the user 104 to write graph queries against the graph database 112 makes integrating ML insights into graph data analytics simple and intuitive for the user 104. This provides the user 104 with the flexibility to create complex graph queries that combine one or more queries against the graph dataset(s) 122 stored in the graph database 112 with one or more queries against the output graph dataset 126 generated by the ML model 116 at the same time.

As mentioned above, the ML model 116 may be implemented as a GNN. Doing inference using a GNN may be time consuming, because it typically requires at least some of the following compute intensive steps: 1) collecting an ego network of a target node; 2) generating node embeddings by performing GNN forward message passing over the ego network; and 3) predicting a target feature based on the node embeddings. Further, even with pre-computed node embeddings, link prediction requires computing a likelihood of all possible edges forming between any pair of nodes in the graph, ranking these likelihoods, and finding a predetermined number of the most relevant edges, referred to as top-k links. All of these operations can be time consuming. However, based on an investigation of how knowledge graph embedding models work, it was determined that the top-k link prediction task can be simplified into a search for a predetermined number K of most similar embeddings.

To minimize the overall response time, the node embeddings may be precomputed during the model training process for all of the graph-based training tasks. By removing the cost of first two steps outside inference, the cost of inferencing node classification, node regression, edge classification, and edge regression may be reduced. For example, inference time may be reduced by about fifty times.

Link prediction may involve two different tasks. First, a tail node is predicted. This requires a graph query identifying a head node and a relationship type ("relation") and determines the predetermined number K of most relevant tail nodes that satisfy a triplet <head, relation, tail>. Then, the relevance of the predicted tail node is determined according a selected first score function. The first scoring function may be expressed as F(head_emb, relation_emb, tail_emb) where a variable "head_emb" represents the head node embeddings, a variable "relation_emb" represents the relation embeddings, and a variable "tail_emb" represents the tail node embeddings. Second, a head node is predicted. This requires a graph query identifying a relation and a tail node and determines the predetermined number K of most relevant head nodes that satisfy the triplet <head, relation, tail>. Then, the relevance of the predicted head node is determined according a selected second score function. The second scoring function may also be expressed as F(head_emb, relation_emb, tail_emb).

By way of a non-limiting example, predicting the tail node may require that the training task(s) component 322 performs the following:
1. Obtain a list of all candidate tail nodes, referred to as tail_i, where "i" is an index;
2. Calculate the score using the score function for each candidate triplets <head, relation, tail_i> for each tail node in the candidate list;
3. Sort the scores from high to low and select the predetermined number K with the largest scores as predicted top-k tail nodes; and
4. Find the corresponding tail nodes according to the predicted top-k tail nodes.

The process of predicting the tail node is non-trivial. If there a number N of candidate tail nodes, the scoring function must be called N times to obtain the top-k tail nodes.

As mentioned above, this process may be simplified by instead determining the predetermined number K of most similar embeddings, which may be characterized as being a K-most similar embedding search task, and may be sped up using embedding indexing. For example, to perform a link prediction task using a DistMult scoring function (which is an inner product based scoring function, i.e., score=h*r*t), the ML system 114 may build an index table T that stores the embeddings of all of the nodes and uses the inner product as a similarity function, when launching or invoking the inference endpoint 222. If the graph query 102 is a tail node prediction query, when the graph query 102 is received, the ML system 114 obtains the embeddings representing the head node and relation identified in the graph query 102. Then, the ML system 114 calculates a predicted embedding for the tail node, represented by a variable "hr_emb," using Equation 1 below $$hr\_emb = head\_emb * rel\_emb \qquad \text{Equation 1}$$

Next, the ML system 114 performs index searching on the index table T for the top-k most similar embeddings to the predicted embedding. The nodes (e.g., identified by index identifiers) having the top-k most similar embeddings are the predicted results or the k-top predicted tail nodes.

When building the index table T, the ML system 114 may optimize the embedding storage locality by aligning the embedding storage with a CPU cache line. The ML system 114 may optimize the calculation strategy according the size (or number of embeddings stored in) the index table T, and the dimension of the embedding. The ML system 114 may cluster the embeddings so that similar embeddings are stored together, which may speed up the top-k search. By way of a non-limiting example, a tool such as FAISS (available at https://github.com/facebookresearch/faiss) may be used to index the embeddings.

Different models may use different scoring functions. For example, a RGCN model may use a DistMult scoring function, and a Translating Embeddings ("TransE") model may use a different scoring function based on Euclidean distance. Thus, different embedding indexing methods may be used based on the scoring function used. Further, both tail node prediction and head node prediction may be solved using embedding indexing. Thus, different formulas of generating query embedding vectors may be designed for tail node prediction and head node prediction according to the scoring function(s) used.

When launching or invoking the inference endpoint 222, the model management component 312 may build or create the index table T (e.g., from the input graph dataset 400) and initialize a pair of query embedding vector generating functions (one for tail node prediction and one for head node prediction). The index table T used may be scoring function oriented.

By way of a non-limiting example, when predicting the predetermined number K of tail nodes and/or the predetermined number K of head nodes, the model management component 312 may select the following embedding indexing methodology, which generates query embedding vectors for use with the DistMult score function. In this example, the ML system 114 obtains a link prediction inference from DistMult based models by searching the index table T for the predetermined number K of most similar embeddings with the inner product (or dot product) being used as the similarity function. Equation 2 (below) is the DistMult score function:

$$f_r(h, t) = h^T \text{diag}(r)t = \sum_{i=0}^{d-1} [r]_i \cdot [h]_i \cdot [t]_i \quad \text{Equation 2}$$

In Equation 2, a variable "r" represents the relation embedding, a variable "h" represents the head node embedding, and a variable "t" represents the tail node embedding. The logic behind the DistMult score function is that if the head node is linked to the tail node under the relation, then the dot product of the head node embedding (represented by the variable "h") and the relation embedding (represented by the variable "r") should be close to the tail node embedding (represented by the variable "t"), and the dot product of the tail node embedding (represented by the variable "t") and the relation embedding (represented by the variable "r") should be close to the head node embedding (represented by the variable "h"). Accordingly, ranking the top-k tail nodes for the tail prediction task can be viewed as (a) calculating the embedding of the predicted tail node (hr_emb=h_emb*r_emb) and (b) searching for the predetermined number K of tail node embeddings (t_emb) that are most similar to the calculated embedding (hr_emb) using the inner product to determine similarity. Further, ranking the top-k head nodes for head prediction task can be viewed as (a) calculating the embedding of the predicted head node (rt_emb=r_emb*t_emb) and (b) searching for the predetermined number K of head node embeddings (h_emb) most similar to the calculated embedding (rt_emb) using the inner product to determine similarity. Thus, the ML system 114 may build the embedding index table T of all of the node embeddings, calculate an embedding for each node to be predicted, and perform DistMult-based link prediction tasks by searching the index table T for the predetermined number K of most similar embeddings to the calculated embedding. In addition to or instead of node prediction, this method may be used to perform link prediction (e.g., with a DistMult KGE model, a RGCN model, and the like).

By way of another non-limiting example, when predicting the predetermined number K of tail nodes and/or the predetermined number K of head nodes, the model management component 312 may select the following embedding indexing methodology, which generates query embedding vectors for use with the TransE score function and/or the RotatE score function. In this example, the ML system 114 obtains link prediction inference of the TransE/RotatE based models by searching the index table T for the predetermined number K of most similar embeddings with an L2 similarity function being used to determine similarity.

Equation 3 may be used as the TransE score function (with L2 distance):

$$f = -\|h+r-t\|_2 \quad \text{Equation 3}$$

In Equation 3, the variable "r" represents the relation embedding, the variable "h" represents the head node embedding, and the variable "t" represents the tail node embedding. The logic behind the TransE scoring function is that if the head node is linked to the tail node under the relation, then the sum of the head node embedding (represented by the variable "h") and the relation embedding (represented by the variable "r") should be close to the tail node embedding (represented by the variable "t"), and the sum of the tail node embedding (represented by the variable "t") and the relation embedding (represented by the variable "r") should be close to the head node embedding (represented by the variable "h"). Accordingly, ranking the top-k tail nodes for tail prediction task can be viewed as (a) calculating the embedding of the predicted tail node (hr_emb=h_emb+r_emb), and (b) searching for the predetermined number K of tail node embeddings (t_emb) that are most similar to the calculated embedding (hr_emb) using the L2 distance similarity. Further, ranking the top-k head nodes for head prediction task can be viewed as (a) calculating the embedding of the predicted head node (rt_emb=t_emb−r_emb) and (b) searching for the predetermined number K of head node embeddings (h_emb) most similar to the calculated embedding (rt_emb) using the L2 distance similarity.

Equation 4 may be used as the RotatE score function:

$$f = -\|h \circ r - t\|_2, \text{ where } |r|=1 \quad \text{Equation 4}$$

In Equation 4, the variable "r" represents the relation embedding, the variable "h" represents the head node embedding, and the variable "t" represents the tail node embedding. However, in the expression that the absolute value of the variable "r" is equal one, the variable "r" represents a counterclockwise rotation. The logic behind the RotatE scoring function is that if the head node is linked to the tail node under the relation, then the Hadamard product or element-wise product of the head node embedding (represented by the variable "h") and the relation embedding (represented by the variable "r") should be close to the tail node embedding (represented by the variable "t"), and the Hadamard product or element-wise product of the tail node embedding (represented by the variable "t") and the relation embedding (represented by the variable "r") should be close to the head node embedding (represented by the variable "h"). Accordingly, ranking the top-k tail nodes for tail prediction task can be viewed as (a) calculating the embedding of the predicted tail node (hr_emb=h_emb o r_emb), and (b) searching for the predetermined number K of tail node embeddings (t_emb) that are most similar to the calculated embedding (hr_emb) using the L2 distance similarity. Further, ranking the top-k head nodes for head prediction task can be viewed as (a) calculating the embedding of the predicted head node (rt_emb=t_emb o (−r_emb)), and (b) searching for the predetermined number K of head node embeddings (h_emb) most similar to the calculated embedding (rt_emb) using the L2 distance similarity.

Thus, the ML system 114 may build the embedding index table T of all of the node embeddings, calculate an embedding for each node to be predicted, and perform TransE-based link prediction tasks and/or RotatE-based link prediction tasks by searching the index table T for the predetermined number K of embeddings most similar to the calculated embedding. In addition to or instead of node prediction, this method may be used to perform link prediction (e.g., with a TransE KGE model, a RotatE model, and the like).

Figure 7:
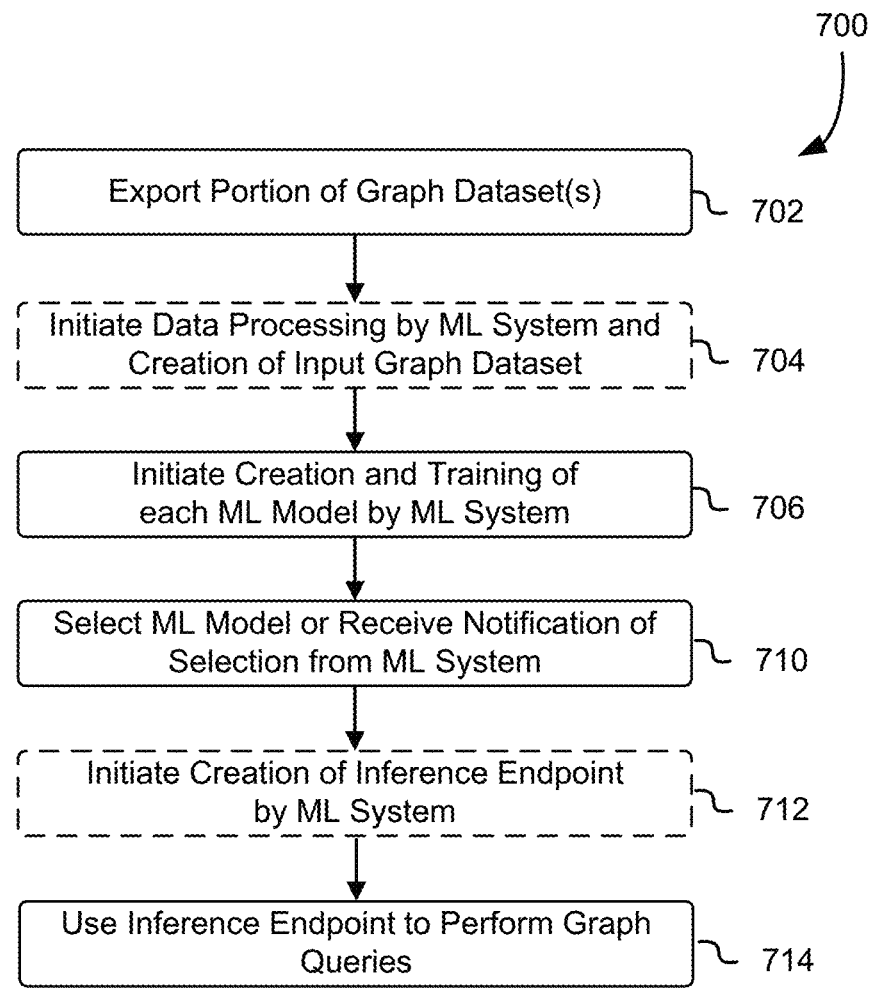
FIG. 7 is a flow diagram of a method that may be performed by the graph database to create, train, and deploy a machine learning model, which may be subsequently queried with a graph query.

FIG. 7 is a flow diagram of a method 700 that may be performed by the graph database 112 (see FIGS. 1-6). The method 700 may be used to create, train, and deploy a ML model that may be subsequently queried with the graph query 102 (see FIGS. 1 and 2). In first block 702, the graph database 112 exports the data 332 (see FIGS. 3-6). As described above, the graph database 112 may also receive user supplied configuration information, which the graph database 112 may store as the configuration information 336 (see FIGS. 2 and 3).

Then, in optional block 704, the graph database 112 initiates processing of the data 332 and the configuration information 336, when present, by the ML system 114 to create the input graph dataset 400. For example, the graph database 112 may instruct the ML system 114 (see FIGS. 1-6) to process the data 332 and the configuration information 336, when present. In embodiments omitting optional block 704, the data 332 may be used as the input graph dataset 400 and the graph database 112 may advance from block 702 to block 706.

Then, in block 706, the graph database 112 initiates creation and training of each ML model in the set of ML models 500 (see FIGS. 5 and 6). For example, the graph database 112 instructs the ML system 114 to create and train each ML model in the set of ML models 500. As the ML system 114 trains each of the ML models, the ML system 114 obtains (e.g., calculates) training results for each ML model in the set of ML models 500. By way of non-limiting examples, the training results may include final graph embeddings for a link prediction task, computed predictions for a node classification task or a node regression task, predicted labels, parameters of the model, and the like. Alternatively, the training results may be calculated after the set of ML models 500 has been trained. Then, in block 708, the ML system 114 outputs the training results. The training results obtained for each ML model in the set of ML models 500 may be stored in the object 334 (see FIGS. 3-6) along with the ML model. While the graph database 112 has been described as instructing the ML system 114 to obtain the training results, in alternate embodiments, the graph database 112 may perform this function.

In block 710, the graph database 112 may select one or more models in the set of ML models 500 having a desired performance (e.g., as determined at least in part by the objective metric). For example, in block 710, the graph database 112 may select the ML model 116 (see FIGS. 1, 2, 5, and 6). Alternatively, the ML system 114 may perform this function. When this is the case, in block 710, the graph database 112 receives a notification from the ML system 114 of the selection of the ML model 116. Then, in optional block 712, the graph database 112 may initiate creation of the inference endpoint 222 (see FIGS. 2 and 6). For example, the graph database 112 may instruct the ML system 114 to create the inference endpoint 222. Alternatively, the ML system 114 may automatically create the inference endpoint 222 without further input from the graph database 112. In such embodiments, block 712 may be omitted and the graph database 112 may advance from block 710 to block 714. At this point, in block 714, the graph database 112 may use the inference endpoint 222 to perform queries against the ML model 116.

Figure 8:
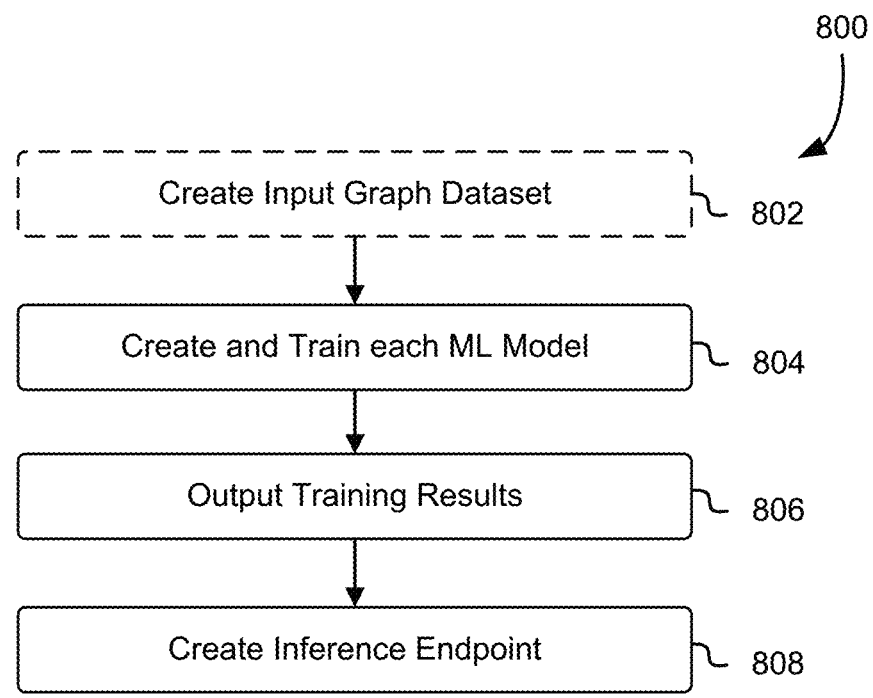
FIG. 8 is a flow diagram of a method that may be performed by the machine learning system to create, train, and deploy the machine learning model, which may be subsequently queried with the graph query.

FIG. 8 is a flow diagram of a method 800 that may be performed by the ML system 114 (see FIGS. 1-6). The method 800 may be used to create, train, and deploy a ML model that may be subsequently queried with the graph query 102 (see FIGS. 1 and 2). In optional first block 802, the ML system 114 creates the input graph dataset 400 (see FIGS. 4-6) by processing the data 332 (see FIGS. 3-6). Optionally, the ML system 114 may also process the configuration information 336 (see FIGS. 2 and 3). In block 802, the ML system 114 may receive an instruction sent by the graph database 112 (see FIGS. 1-6) in optional block 704 (see FIG. 7) of the method 700 (see FIG. 7), and, create the input graph dataset 400 in response to that instruction. In embodiments omitting optional first block 802, the data 332 may be used as the input graph dataset 400 and the method 800 may begin at block 804.

In block 804, the ML system 114 creates and trains each ML model in the set of ML models 500 (see FIGS. 5 and 6). For example, in block 804, the ML system 114 may receive an instruction sent by the graph database 112 in block 706 (see FIG. 7) of the method 700 (see FIG. 7) and, in response to this instruction, create and train each ML model in the set of ML models 500.

In block 806, the ML system 114 outputs the training results for each ML model in the set of ML models 500. The training results may include final graph embeddings for a link prediction task, computed predictions for a node classification task or a node regression task, predicted labels, parameters of the model, and the like. As mentioned above, the training results may be calculated as the set of ML models 500 is trained and or after the set is trained. The ML system 114 may store the training results in the object 334 (see FIGS. 3-6) along with the set of ML models 500. As mentioned above, while the ML system 114 is described as obtaining the training results, in alternate embodiments, the graph database 112 may perform this function.

In block 808, the ML system 114 creates the inference endpoint 222 (see FIGS. 2 and 6) for the selected ML model 116 (see FIGS. 1, 2, 5, and 6). For example, the ML system 114 may create the inference endpoint 222 in response to an instruction sent by the graph database 112 in block 712 (see FIG. 7) of the method 700 (see FIG. 7). At this point, the graph database 112 may use the inference endpoint 222 implemented by the ML system 114 to perform queries against the ML model 116.

In embodiments in which the ML model 116 is preexisting and was created without the ML system performing blocks 802-806, the ML system 114 may simply create the inference endpoint 222 in block 808. In other words, the ML system 114 may be used to create inference endpoints for ML models created using other methods. The graph database 112 may use such inference endpoints to perform queries against these ML models.

Figure 9:
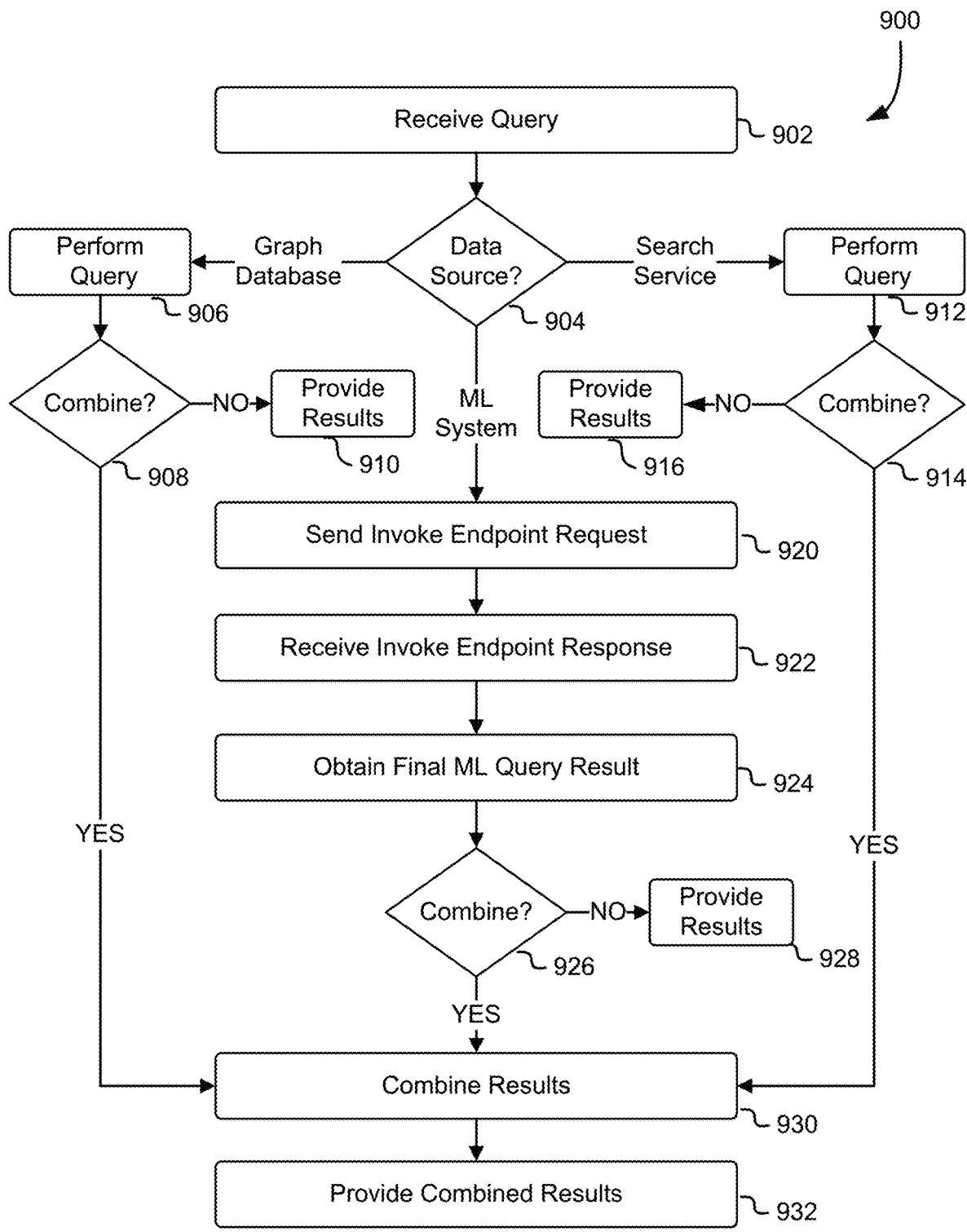
FIG. 9 is a flow diagram of a method that may be performed by the graph database when the graph database receives a query or request for another type of data analysis.

FIG. 9 is a flow diagram of a method 900 that may be performed by the graph database 112 (see FIGS. 1-6) when the graph database 112 receives a query (or request for another type of data analysis). In first block 902, the graph database 112 receives the query. Then, in decision block 904, the graph database 112 determines whether at least a portion of the query is to be performed by the graph database 112, the ML system 114 (see FIGS. 1-6), or the external search service 232 (see FIG. 1).

When the graph database 112 decides in decision block 904 that at least a graph portion of the query is to be performed by the graph database 112, the graph database 112 advances to block 906. In block 906, the graph database 112 performs the graph portion of the query and obtains graph query results. Then, in decision block 908, the graph database 112 determines whether the graph query results are to be combined with results obtained from the ML system 114. The decision in decision block 908 is "NO" when the graph query results are not to be combined with results obtained from the ML system 114. When decision in decision block 908 is "NO," in block 910, the graph database 112 provides the graph query results to the entity that sent the query to the graph database 112. On the other hand, the decision in decision block 908 is "YES" when the graph query results are to be combined with results obtained from the ML system 114. When the decision in decision block 908 is "YES," the graph database 112 advances to block 930.

When the graph database 112 decides in decision block 904 that at least an external portion of the query is to be performed by the external search service 232, the graph database 112 advances to block 912. In block 912, the connection tool 230 of the graph database 112 sends a request to the external search service 232 to perform the query or requested analysis, and return external results to the connection tool 230. After the graph database 112 receives the external results, in decision block 914, the graph database 112 determines whether the external results are to be combined with results obtained from the ML system 114. The decision in decision block 914 is "NO" when the external results are not to be combined with results obtained from the ML system 114. When decision in decision block 914 is "NO," in block 916, the graph database 112 provides the external results to the entity that sent the query to the graph database 112. On the other hand, the decision in decision block 914 is "YES" when the external results are to be combined with results obtained from the ML system 114. When the decision in decision block 914 is "YES," the graph database 112 advances to block 930.

When the graph database 112 decides in decision block 904 that at least a ML portion of the query is to be performed by the ML system 114 (e.g., the query includes the custom commands and/or parameters identifying the ML model 116), the graph database 112 advances to block 920. In block 920, the graph database 112 sends the invoke endpoint request 124 to the inference endpoint 222 implemented by the ML system 114. The invoke endpoint request 124 includes information needed by the ML system 114 to perform the ML portion of the query. As explained above, before the invoke endpoint request 124 is sent, the graph query engine 210 may generate the remote call communication 214 and send the remote call communication 214 to the model connector component 220. Then the model connector component 220 may formulate and send the invoke endpoint request 124 to the ML system 114.

In response to the invoke endpoint request 124, the ML system 114 may download the ML model 116 from the object 334. The ML system 114 obtains input data from the invoke endpoint request 124 that was included in the ML portion of the query. Then, the ML system 114 uses the input data (e.g., a head node and a relationship) to execute the ML model 116 and obtain the output graph dataset 126 (see FIGS. 1, 2, and 6). Next, the ML system 114 formulates the invoke endpoint response 128, which includes the ML result, and sends the invoke endpoint response 128 to the graph database 112. As mentioned above, the ML result may be included in the invoke endpoint response 128 as an object, such as a BindingSet.

In block 922, the graph database 112 receives the invoke endpoint response 128. Then, in block 924, the graph database 112 obtains final ML query results from the invoke endpoint response 128. For example, the graph database 112 may query the ML result (e.g., the BindingSet) included in the invoke endpoint response 128 to obtain the final ML query results.

Then, in decision block 926, the graph database 112 determines whether the final ML query results are to be combined with the graph query results obtained from the graph database 112 and/or the external results obtained from the external search service 232. The decision in decision block 926 is "NO" when the final ML query results are not to be combined with either the graph query results or the external results. When decision in decision block 926 is "NO," in block 928, the final ML query results are provided to the entity that sent the query to the graph database 112. On the other hand, the decision in decision block 926 is "YES" when the final ML query results are to be combined with the graph query results and/or the external results. When the decision in decision block 926 is "YES," the graph database 112 advances to block 930.

In block 930, the graph database 112 combines the final ML query results with the graph query results and/or the external results. Then, in block 932, the graph database 112 provides the combined results to the entity that sent the query to the graph database 112.

Referring to FIG. 1, the graph query 102 may be configured to allow the user 104 to specify a desired number of results to be returned in response to the graph query 102. For example, if the user 104 would like a list of movies that the ML model 116 predicts a particular person would like, the user 104 may specify that the query results include the top five movies. Further, the graph database 112 may be configured to allow the user 104 to select the desired number of results. By way of yet another non-limiting example, the ML model 116 and/or the ML system 114 may be configured to return the desired number of results.

The graph query 102 may be configured to allow the user 104 to specify a threshold value. For example, if the user 104 would like a list of movies that the ML model 116 predicts a particular person would like, the user 104 may specify that the query results include only movies predicted with a likelihood of being liked by the particular person that exceeds the threshold value. Further, the graph database 112 may be configured to allow the user 104 to specify the threshold value. By way of yet another non-limiting example, the ML model 116 and/or the ML system 114 may be configured to return results based at least in part on the threshold value (e.g., results that exceed the threshold value).

As one skilled in the art will appreciate in light of this disclosure, certain embodiments may be capable of achieving certain advantages, including some or all of the following: (1) improving processing speed of graph queries, (2) improving accuracy of graph queries, and (3) allowing graph database developers to access ML models using conventional graph database tools and standard graph query languages.

Figure 10:
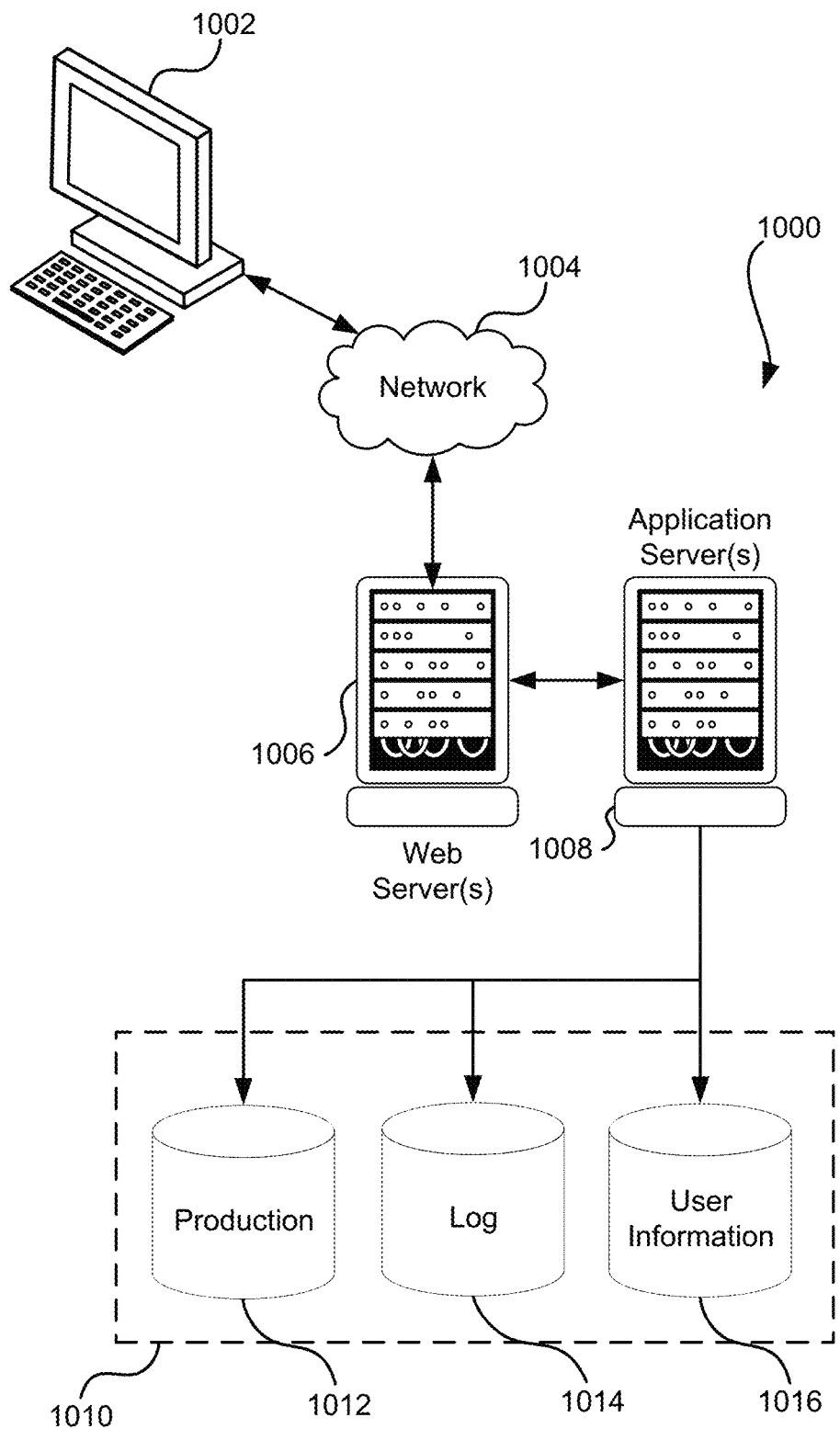
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation ("JSON"), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies and other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client device 1002. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

At least one embodiment of the disclosure can be described in view of the following clauses:

1. A computer-implemented method, comprising:
receiving, at one or more database servers implementing a graph database service, a graph query to be performed against model inference results obtained from a machine learning model;
transmitting a first communication to a machine learning service to cause the machine learning service to obtain model inference results, and to transmit a second communication comprising the model inference results to the graph database, the machine learning model having been trained using at least a portion of one or more graph datasets stored by the graph database service;
receiving the second communication at the graph database service; and
providing, by the graph database service, a response to the graph query that is based at least in part on the model inference results.

2. The computer-implemented method of clause 1, wherein the graph database service determines that the graph query is to be performed against the model inference results obtained from the machine learning model based at least in part on at least one of a command or a parameter value included in the graph query.

3. The computer-implemented method of clause 1 or 2, further comprising:
performing, by the graph database service, at least one query against the one or more graph datasets stored by the graph database to obtain local results; and
combining the model inference results with the local results to obtain combined query results before the response is provided, the response being based at least in part on the combined query results.

4. The computer-implemented method of any of clauses 1-3, further comprising:
communicating, by the graph database service, at least one query to a search service for obtaining external results; and
combining the model inference results with the external results to obtain combined query results before the response is provided, the response being based at least in part on the combined query results.

5. The computer-implemented method of any of clauses 1-4, wherein the portion of the one or more graph datasets is a first portion, the model inference results are first model inference results, and the computer-implemented method further comprises:
updating at least one of the one or more graph datasets stored by the graph database service to obtain one or more updated graph datasets;
exporting at least a second portion of the one or more updated graph datasets from the graph database; and
training the machine learning model using the second portion of the graph dataset before the machine learning service obtains second model inference results.

6. A system, comprising:
one or more processors; and
memory that stores computer-executable instructions that are executable by the one or more processors to cause the system to implement:
a graph database service to:
receive a graph query to be performed against a machine learning model;
transmit a communication based on the graph query to a machine learning service, the machine learning service comprising computing resources to obtain model inference results from the machine learning model;
receive the model inference results from the machine learning service; and
provide query results to an entity based at least in part on the model inference results.

7. The system of clause 6, wherein the graph query comprises an external portion and a machine learning portion, the machine learning portion being performed against the machine learning model, and the computer-executable instructions are executable by the one or more processors to cause the system to implement:
a search service that obtains external results from an external data source based at least in part on the external portion of the graph query, and transmit the external results to the graph database service, the graph database service transmitting the external portion to the search service, and combine the model inference results with the external results to obtain the query results before providing the query results.

8. The system of clause 6 or 7, wherein the graph database service performs at least one query against one or more graph datasets stored by the graph database service to obtain local results, and combine the model inference results with the local results to obtain the query results before providing the query results.

9. The system of any of clauses 6-8, wherein the graph database service:
exports at least a portion of a graph dataset stored by the graph database service,
instructs the machine learning service to generate and train a set of candidate machine learning models, and
selects one of the set of candidate machine learning models as the machine learning model before the machine learning service obtains the model inference results.

10. The system of any of clauses 6-9, wherein the graph database service instructs the machine learning service to:
obtain first node embeddings for a plurality of first nodes in an input graph dataset, a second node embedding for a second node in the input graph dataset, and a relationship embedding for a relationship type in the input graph dataset between the second node and each of the plurality of first nodes, calculate a predicted first node embedding as a function of the second node embedding and the relationship embedding, identify one or more of the first node embeddings that are most similar to the predicted first node embedding as being at least one predicted first node embeddings, and for each of the at least one predicted first node embeddings, identifying one of the plurality of first nodes as a predicted first node.

11. The system of clause 10, wherein the machine learning service uses a first scoring function to determine which of the first node embeddings are most similar to the predicted first node embedding, and the graph database service instructs the machine learning service to:

obtain second node embeddings for a plurality of second nodes in the input graph dataset, and a first node embedding for a first node in the input graph dataset, calculate a predicted second node embedding as a function of the first node embedding and the relationship embedding, identify one or more of the second node embeddings that are most similar to the predicted second node embedding as being at least one predicted second node embeddings, the machine learning service using a second scoring function to determine which of the second node embeddings are most similar to the predicted second node embedding, the second scoring function being different from the first scoring function, and for each of the at least one predicted second node embeddings, identifying one of the plurality of second nodes as a predicted second node.

12. The system of clause 11, wherein the first scoring function is a DistMult scoring function, a TransE scoring function, or a RotatE scoring function.

13. One or more non-transitory computer-readable storage media storing thereon executable instructions that, as a result of being executed by one or more processors of a computer system, cause the computer system to implement a graph database application that:

stores at least one graph dataset;

receives a graph query to be performed against a machine learning model;

communicates the graph query with a machine learning system that uses the machine learning model to obtain model inference results and communicate the model inference results with the graph database application; and provides query results to an entity based at least in part on the model inference results.

14. The one or more non-transitory computer-readable storage media of claim 13, wherein the instructions further comprise instructions that, as a result of being executed by the one or more processors, cause the computer system to implement the machine learning system, which uses the machine learning model to obtain the model inference results and communicate the model inference results with the graph database application.

15. The one or more non-transitory computer-readable storage media of clause 13 or 14, wherein the graph database application:

performs at least one query against the at least one graph dataset to obtain local results; and combines the model inference results with the local results to obtain the query results before the query results are provided.

16. The one or more non-transitory computer-readable storage media of any of clauses 13-15, wherein the graph database application:

communicates at least one query to a search service that obtains external results; and combines the model inference results with the external results to obtain the query results before the query results are provided.

17. The one or more non-transitory computer-readable storage media of any of clauses 13-16, the graph database application:

exports a portion of the at least one graph dataset; and instructs the machine learning system to generate and train a set of candidate machine learning models using the portion of the graph dataset, the machine learning system selecting one of the set of candidate machine learning models as the machine learning model before the machine learning system obtains the model inference results.

18. The one or more non-transitory computer-readable storage media of clause 17, wherein the graph database application instructs the machine learning system to train the set of candidate machine learning models by performing a training task comprising at least one of node classification, node regression, edge classification, edge regression, or link prediction.

19. The one or more non-transitory computer-readable storage media of any of clauses 13-18, wherein obtaining the model inference results comprises a link prediction task and the graph database application instructs the machine learning system to:

obtain first node embeddings for a plurality of first nodes in an input graph dataset, a second node embedding for a second node in the input graph dataset, and a relationship embedding for a relationship type in the input graph dataset between the second node and each of the plurality of first nodes, calculate a predicted first node embedding as a function of the second node embedding and the relationship embedding, identify one or more of the first node embeddings that are most similar to the predicted first node embedding as being at least one predicted first node embeddings, and for each of the at least one predicted first node embeddings, identifying one of the plurality of first nodes as a predicted first node.

20. The one or more non-transitory computer-readable storage media of clause 19, wherein the machine learning system uses a first scoring function to determine which of the first node embeddings are most similar to the predicted first node embedding, and the graph database application instructs the machine learning system to:

obtain second node embeddings for a plurality of second nodes in the input graph dataset, and a first node embedding for a first node in the input graph dataset, calculate a predicted second node embedding as a function of the first node embedding and the relationship embedding, identify one or more of the second node embeddings that are most similar to the predicted second node embedding as being at least one predicted second node embeddings, the machine learning system using a second scoring function to determine which of the second node embeddings are most similar to the predicted second node embedding, the second scoring function being different from the first scoring function, and for each of the at least one predicted second node embeddings, identifying one of the plurality of second nodes as a predicted second node.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    obtaining, at a graph database, a graph query that identifies criteria to identify a graph data structure responsive to the graph query, wherein the graph query identifies input data to be used by a trained machine learning model to generate at least a portion of the graph data structure;
    executing the trained machine learning model against the input data to obtain an inference result representing a first subset of graph data;
    applying the graph query to the first subset of the graph data represented by the inference result to generate first query results corresponding to a first portion of the graph data structure that is responsive to the graph query;
    applying the graph query to a second subset of the graph data stored in the graph database to generate second query results corresponding to a second portion of the graph data structure that is responsive to the graph query;
    combining at least the first portion of the graph data structure generated by application of the graph query to the first subset of the graph data represented by the inference result and the second portion of the graph data structure generated by application of the graph query to the second subset of the graph data stored in the graph database to result in the graph data structure responsive to the graph query; and
    providing, by the graph database the graph data structure in response to the graph query.

2. The computer-implemented method of claim 1, further comprising:
    exporting, by the graph database, the input data to be used by the trained machine learning model to generate the first portion of the graph data structure.

3. The computer-implemented method of claim 1, further comprising:
    using an application programing interface ("API") to execute the trained machine learning model against the input data.

4. The computer-implemented method of claim 1, further comprising:
    communicating, by the graph database, at least one query to a search service to obtain external results corresponding to a third portion of the graph data structure, wherein the first, second, and third portions of the graph data structure are combined to result in the graph data structure responsive to the graph query.

5. The computer-implemented method of claim 1, wherein the trained machine learning model was trained using at least a first portion of one or more graph datasets stored by the graph database, the inference result is a first model inference result, and the computer-implemented method further comprises:
    updating at least one of the one or more graph datasets stored by the graph database to obtain one or more updated graph datasets;
    exporting at least a second portion of the one or more updated graph datasets from the graph database; and
    training the trained machine learning model using the second portion before the trained machine learning model is used to obtain a second model inference result.

6. A system, comprising:
    one or more processors; and
    memory that stores computer-executable instructions that are executable by the one or more processors to cause the system to implement:
        a graph database to:
            obtain a graph query to comprise criteria to identify a graph data structure responsive to the graph query
            use a trained machine learning model to obtain an inference result;
            use a first portion of the criteria to query the inference result to generate first query results corresponding to a first portion of the graph data structure;
            use a second portion of the criteria to query graph data stored in the graph database to obtain second query results corresponding to a second portion of the graph data structure;
            obtain the graph data structure by combining at least the first portion of the graph data structure and the second portion of the graph data structure; and
            provide the graph data structure in response to the graph query.

7. The system of claim 6, wherein the graph database is to:
    cause a search service to obtain external third query results corresponding to a third portion of the graph data structure from at least one external data source based at least in part on at least one external query portion of the graph query, and transmit the third query results to the graph database, wherein the graph database is to obtain the graph data structure by combining at least the first, second, and third portions of the graph data structure.

8. The system of claim 6, wherein the graph database is to export input graph data to be used by the trained machine learning model to generate the first portion of the graph data structure.

9. The system of claim 6, wherein the graph database is to:
    export at least a portion of a graph dataset stored by the graph database,
    instruct a machine learning service to generate and train a set of candidate machine learning models, and
    select one of the set of candidate machine learning models as the trained machine learning model before the trained machine learning model is caused to obtain the inference result.

10. The system of claim 6, wherein the graph database is to instruct a machine learning service to:
    obtain first node embeddings for a plurality of first nodes in an input graph dataset, a second node embedding for a second node in the input graph dataset, and a relationship embedding for a relationship type in the input graph dataset between the second node and each of the plurality of first nodes, calculate a predicted first node embedding as a function of the second node embedding and the relationship embedding, identify one or more of the first node embeddings that are most similar to the predicted first node embedding as being at least one predicted first node embedding, and for each of the at least one predicted first node embedding, identifying one of the plurality of first nodes as a predicted first node.

11. The system of claim 10, wherein the machine learning service uses a first scoring function to determine which of the first node embeddings are most similar to the predicted first node embedding, and the graph database is to instruct the machine learning service to:

obtain second node embeddings for a plurality of second nodes in the input graph dataset, and a first node embedding for a first node in the input graph dataset, calculate a predicted second node embedding as a function of the first node embedding and the relationship embedding, identify one or more of the second node embeddings that are most similar to the predicted second node embedding as being at least one predicted second node embeddings, the machine learning service using a second scoring function to determine which of the second node embeddings are most similar to the predicted second node embedding, the second scoring function being different from the first scoring function, and for each of the at least one predicted second node embeddings, identifying one of the plurality of second nodes as a predicted second node.

12. The system of claim 11, wherein the first scoring function is a DistMult scoring function, a TransE scoring function, or a RotatE scoring function.

13. One or more non-transitory computer-readable storage media storing thereon executable instructions that, as a result of being executed by one or more processors of a computer system, cause the computer system to implement a graph database application to:

store at least one graph dataset;

obtain a graph query to identify a trained machine learning model;

cause the trained machine learning model to be executed against a portion of graph data stored in the at least one graph dataset to obtain an inference result;

perform at least a portion of the graph query against the inference result to obtain first query results corresponding to a first portion of a graph data structure;

query the at least one graph dataset to obtain second query results corresponding to a second portion of the graph data structure;

combine at least the first portion of the graph data structure and the second portion of the graph data structure to obtain the graph data structure; and provide the graph data structure in response to the graph query.

14. The one or more non-transitory computer-readable storage media of claim 13, wherein the graph database application is to cause a machine learning system to cause the trained machine learning model to obtain the inference result and communicate the inference result to the graph database application.

15. The one or more non-transitory computer-readable storage media of claim 13, wherein the graph database application is to use an application programing interface ("API") to cause the trained machine learning model to be executed against the portion of graph data stored in the at least one graph dataset to obtain the inference result.

16. The one or more non-transitory computer-readable storage media of claim 13, wherein the graph database application is to:

communicate at least one query to a search service that obtains third query results corresponding to a third portion of the graph data structure, the graph data structure to be obtained by combining at least the first, second, and third portions of the graph data structure.

17. The one or more non-transitory computer-readable storage media of claim 13, wherein the graph database application is to:

export a portion of at least one graph dataset; and instruct a machine learning system to generate and train a set of candidate machine learning models using the portion of the at least one graph dataset, the machine learning system to select one of the set of candidate machine learning models as the trained machine learning model before the machine learning system trained machine learning model is caused to obtain the inference result.

18. The one or more non-transitory computer-readable storage media of claim 17, wherein the graph database application is to instruct the machine learning system to train the set of candidate machine learning models by performing a training task comprising at least one of node classification, node regression, edge classification, edge regression, or link prediction.

19. The one or more non-transitory computer-readable storage media of claim 13, wherein obtaining the inference result comprises a link prediction task and the graph database application is to instruct a machine learning system to:

obtain first node embeddings for a plurality of first nodes in an input graph dataset, a second node embedding for a second node in the input graph dataset, and a relationship embedding for a relationship type in the input graph dataset between the second node and each of the plurality of first nodes, calculate a predicted first node embedding as a function of the second node embedding and the relationship embedding, identify one or more of the first node embeddings that are most similar to the predicted first node embedding as being at least one predicted first node embeddings, and for each of the at least one predicted first node embeddings, identifying one of the plurality of first nodes as a predicted first node.

20. The one or more non-transitory computer-readable storage media of claim 19, wherein the machine learning system uses a first scoring function to determine which of the first node embeddings are most similar to the predicted first node embedding, and the graph database application is to instruct the machine learning system to:

obtain second node embeddings for a plurality of second nodes in the input graph dataset, and a first node embedding for a first node in the input graph dataset, calculate a predicted second node embedding as a function of the first node embedding and the relationship embedding, identify one or more of the second node embeddings that are most similar to the predicted second node embedding as being at least one predicted second node embeddings, the machine learning system using a second scoring function to determine which of the second node embeddings are most similar to the predicted second node embedding, the second scoring function being different from the first scoring function, and for each of the at least one predicted second node embeddings, identifying one of the plurality of second nodes as a predicted second node.

\* \* \* \* \*

UNITED STATES PATENT AND TRADEMARK OFFICE
CERTIFICATE OF CORRECTION

PATENT NO. : 12,072,936 B2
APPLICATION NO. : 17/313769
DATED : August 27, 2024
INVENTOR(S) : Karthik Gurumoorthy Subramanya Bharathy et al.

Page 1 of 1

It is certified that error appears in the above-identified patent and that said Letters Patent is hereby corrected as shown below:

In the Claims

Column 31, Line 45 in Claim 1: "providing, by the graph database the graph data structure" should read as: --providing, by the graph database, the graph data structure--

Column 32, Line 40 in Claim 7: "cause a search service to obtain external third query" should read as: --cause a search service to obtain third query--

Column 34, Line 24 in Claim 17: "ing model before the machine learning system trained" should read as: --ing model before the trained--

Signed and Sealed this
Fifteenth Day of October, 2024

Katherine Kelly Vidal
*Director of the United States Patent and Trademark Office*